(12) United States Patent
Serizawa et al.

(10) Patent No.: US 11,408,050 B2
(45) Date of Patent: Aug. 9, 2022

(54) COMPONENT MANUFACTURING METHOD AND COMPONENT

(71) Applicant: TOYOTA JIDOSHA KABUSHIKI KAISHA, Toyota (JP)

(72) Inventors: Kazumi Serizawa, Toyota (JP); Haruka Yano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 385 days.

(21) Appl. No.: 16/109,957

(22) Filed: Aug. 23, 2018

(65) Prior Publication Data

US 2019/0071749 A1  Mar. 7, 2019

(30) Foreign Application Priority Data

Sep. 4, 2017 (JP) .............................. JP2017-169400

(51) Int. Cl.
| | |
|---|---|
| *C21D 10/00* | (2006.01) |
| *C21D 9/14* | (2006.01) |
| *B23K 26/356* | (2014.01) |
| *B23K 26/00* | (2014.01) |
| *C21D 1/09* | (2006.01) |
| *C21D 7/06* | (2006.01) |
| *C21D 9/08* | (2006.01) |

(52) U.S. Cl.
CPC .......... *C21D 10/005* (2013.01); *B23K 26/009* (2013.01); *B23K 26/356* (2015.10); *C21D 9/14* (2013.01); *C21D 1/09* (2013.01); *C21D 7/06* (2013.01); *C21D 9/08* (2013.01)

(58) Field of Classification Search
CPC .. B23K 26/009; B23K 26/356; C21D 10/005; C21D 1/09; C21D 7/06; C21D 9/08; C21D 9/14
See application file for complete search history.

(56) References Cited

U.S. PATENT DOCUMENTS 4,539,461 A * 9/1985 Benedict ................... C21D 1/09
148/565
5,514,229 A * 5/1996 Parkansky ............. B22D 27/02
148/566

(Continued)

FOREIGN PATENT DOCUMENTS

| CN | 101701282 A | 5/2010 |
|---|---|---|
| CN | 102837127 A | 12/2012 |

(Continued)

*Primary Examiner* — Ibrahime A Abraham
*Assistant Examiner* — Frederick F Calvetti
(74) *Attorney, Agent, or Firm* — Oblon, McClelland, Maier & Neustadt, L.L.P.

(57) ABSTRACT

A component manufacturing method includes: disposing, in a fluid, an unprocessed component having a hole that has an opening in an outer surface of the unprocessed component; creating a flow of the fluid such that air bubbles resulting from laser peening performed by irradiating an inner wall of the hole of the unprocessed component with a laser beam in the fluid flow along the hole; setting an irradiation area of the laser beam in an inner surface of the hole; and in the fluid of which the flow has been created, irradiating the irradiation area with the laser beam from the side of the outer surface through the opening.

6 Claims, 17 Drawing Sheets

(56) References Cited

U.S. PATENT DOCUMENTS

| | | | | |
|---|---|---|---|---|
| 5,675,892 A * | 10/1997 | Mannava | ................ | B23P 6/007 29/889.7 |
| 5,744,781 A * | 4/1998 | Yeaton | ................ | B23K 26/146 219/121.84 |
| 5,795,631 A * | 8/1998 | Parkansky | ............ | B22D 27/02 204/280 |
| 5,948,293 A * | 9/1999 | Somers | ................ | C21D 10/005 219/121.85 |
| 6,049,058 A * | 4/2000 | Dulaney | ............ | B23K 26/1224 219/121.84 |
| 6,159,619 A * | 12/2000 | Rockstroh | ............ | C21D 10/005 148/565 |
| 6,559,415 B1 * | 5/2003 | Mannava | ................ | C21D 10/005 219/121.85 |
| 6,566,629 B1 * | 5/2003 | Dulaney | ................ | B23K 26/06 219/121.74 |
| 6,629,464 B2 * | 10/2003 | Suh | ........................ | G01N 29/11 73/620 |
| 6,858,083 B2 * | 2/2005 | Sterud | .................... | B29C 65/32 156/380.2 |
| 7,736,450 B2 * | 6/2010 | Bailey | ...................... | C21D 1/09 148/426 |
| 7,942,641 B2 * | 5/2011 | Bailey | .................. | F04D 29/324 416/241 R |
| 8,319,150 B2 * | 11/2012 | Lawrence | ............. | B23K 26/08 219/121.81 |
| 8,354,613 B2 * | 1/2013 | Sugihashi | .......... | F02M 63/0225 219/121.84 |
| 8,431,859 B2 * | 4/2013 | Sasaki | ................ | B23K 26/352 219/121.6 |
| 9,186,751 B2 * | 11/2015 | Chida | ................ | B23K 26/1476 |
| 9,227,268 B1 * | 1/2016 | McCoy | ................ | B23K 26/356 |
| 9,580,815 B2 * | 2/2017 | Ren | ........................... | C23C 4/04 |
| 9,839,976 B2 * | 12/2017 | Jennings | ............. | B23K 26/0738 |
| 10,196,706 B2 * | 2/2019 | Glaser | .................... | B23K 26/02 |
| 10,226,838 B2 * | 3/2019 | Nomura | ................ | B23K 26/356 |
| 10,857,623 B2 * | 12/2020 | Jennings | ............. | B23K 26/0613 |
| 2002/0000428 A1 * | 1/2002 | Dulaney | ................ | B23K 26/356 219/121.76 |
| 2002/0008087 A1 * | 1/2002 | Clauer | ................ | C21D 10/005 219/121.84 |
| 2004/0238509 A1 * | 12/2004 | Clauer | ................ | C21D 10/005 219/121.85 |
| 2005/0045598 A1 * | 3/2005 | Even | .................... | C21D 10/005 219/121.6 |
| 2006/0006158 A1 * | 1/2006 | Lawrence | ............... | F01D 5/286 219/121.82 |
| 2006/0101883 A1 * | 5/2006 | Garza | ...................... | B24C 1/10 72/53 |
| 2008/0241546 A1 | 10/2008 | McClain et al. | | |
| 2012/0325790 A1 | 12/2012 | Chida et al. | | |
| 2016/0083815 A1 * | 3/2016 | Glaser | .................... | B23K 26/03 72/56 |
| 2016/0333433 A1 * | 11/2016 | Petrosky | ................ | B23K 26/356 |

FOREIGN PATENT DOCUMENTS

| | | |
|---|---|---|
| CN | 103805769 A | 5/2014 |
| CN | 106244794 A | 12/2016 |
| CN | 106636607 A | 5/2017 |
| EP | 2 211 050 A1 | 7/2010 |
| JP | 04-175561 | 6/1992 |
| JP | 2006-322446 | 11/2006 |
| JP | 2008-260064 | 10/2008 |
| JP | 2009-074417 | 4/2009 |
| JP | 2016-515475 | 5/2016 |
| WO | WO 2014/170868 A1 | 10/2014 |

* cited by examiner

LOW  HIGH

TENSILE
STRESS

|  | SHOT PEENING | LASER PEENING |
|---|---|---|
| COMPRESSIVE RESIDUAL STRESS | A | A |
| NARROW-HOLE PROCESSABILITY | B | A |

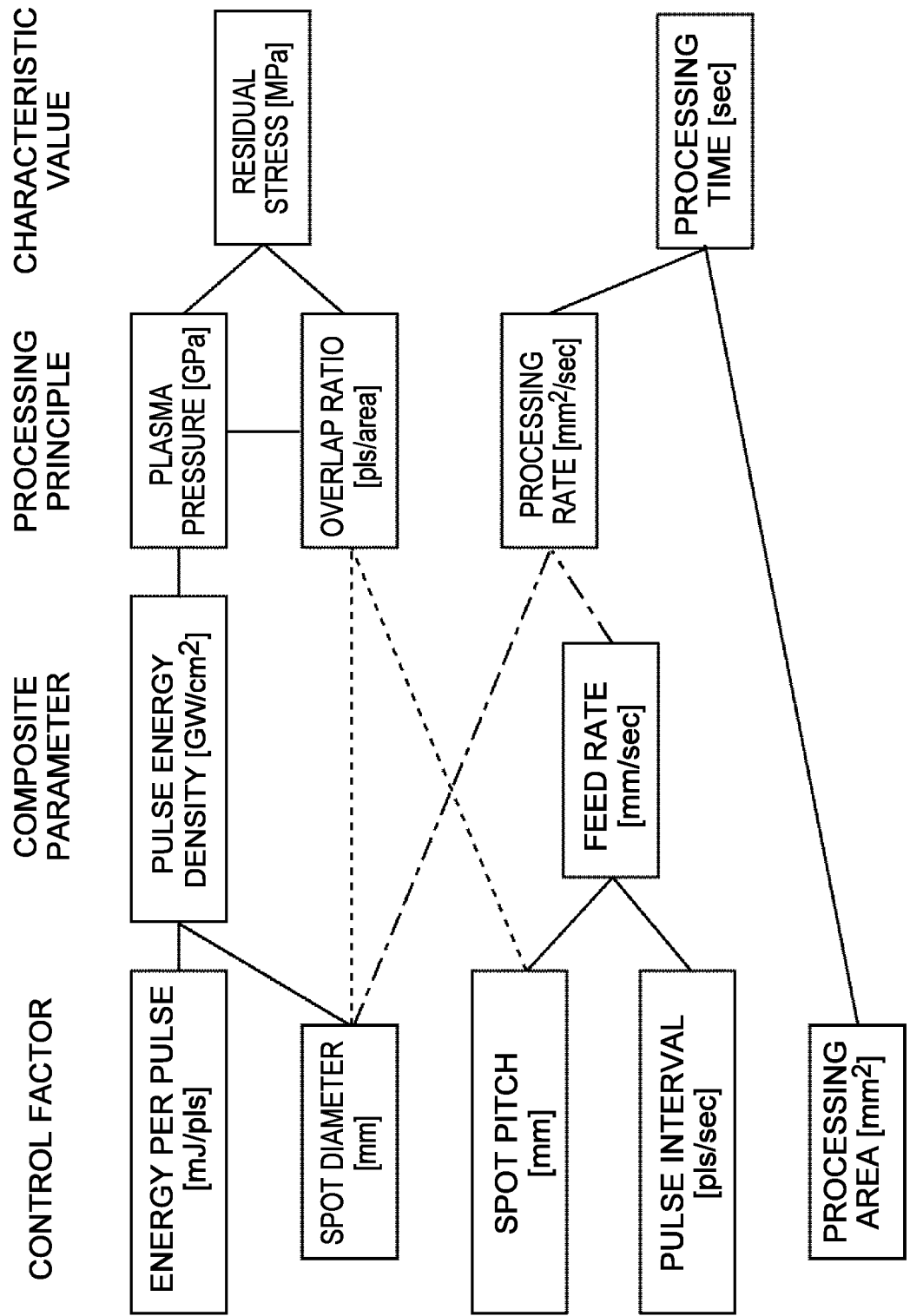

COMPONENT MANUFACTURING METHOD AND COMPONENT

INCORPORATION BY REFERENCE

The disclosure of Japanese Patent Application No. 2017-169400 filed on Sep. 4, 2017 including the specification, drawings and abstract is incorporated herein by reference in its entirety.

BACKGROUND

1. Technical Field

The present disclosure relates to a component manufacturing method and a component.

2. Description of Related Art

Laser peening is known as a processing technique for improving the strength of a surface of a component being processed. As described in Japanese Patent Application Publication No. 2006-322446 (JP 2006-322446 A), Japanese Patent Application Publication No. 2009-074417 (JP 2009-074417 A), Published Japanese Translation of PCT Application No. 2016-515475 (JP-A-2016-515475), and Japanese Patent Application Publication No. 2008-260064 (JP 2008-260064 A), laser peening involves focusing a laser beam on a surface of a component in water to laser-ablate the surface. Thus, plasma is generated on the surface of the component. The pressure of the generated plasma causes shockwaves, which plastically deform the surface of the component. As a result, a compressive stress occurs in the surface of the component. The resulting compressive stress is imparted to the surface of the component as a compressive residual stress.

Thus, laser peening enhances the strength of a component by imparting a compressive residual stress to a surface of the component. Laser peening is superior in micro-processability to shot peening described in Japanese Patent Application Publication No. 04-175561.

JP 2006-322446 A describes a component (common rail) which has a rail hole provided inside and branch holes extending from the rail hole to an outer surface of the component, and in which laser peening is performed on an opening of the branch hole on the rail hole side and on an inner wall of the rail hole. In JP 2006-322446 A, laser peening is performed while the spot of a laser beam is shifted.

SUMMARY

During laser peening, when air bubbles due to an instantaneous boiling phenomenon or cavitation air bubbles forming upon disappearance of plasma (hereinafter referred to as air bubbles etc.) interfere with a laser beam with which the next spot is irradiated, the laser beam with which a surface is irradiated may decrease in intensity and fail to impart a sufficient compressive residual stress to the spot. Moreover, having compressive properties, these air bubbles etc. absorb the pressure of the plasma generated by the next laser beam. This may result in a variation in the compressive residual stress among the spots.

When an inner wall of a branch hole of a component is irradiated with a laser beam from the outer side of the branch hole at a predetermined incident angle, air bubbles etc. forming on the surface of the inner wall of the branch hole may accumulate inside the branch hole and interfere with the laser beam. Then, the strength of the component cannot be enhanced due to an inevitable decrease or variation in the compressive residual stress among the spots of the laser beam.

The present disclosure provides a component manufacturing method that can enhance the strength of a component, and a component having enhanced strength.

A component manufacturing method according to an aspect of the present disclosure includes: disposing, in a fluid, an unprocessed component having a hole that has an opening in an outer surface of the unprocessed component; creating a flow of the fluid such that air bubbles resulting from laser peening performed by irradiating an inner wall of the hole of the unprocessed component with a laser beam in the fluid flow along the hole; setting an irradiation area of the laser beam in an inner surface of the hole; and, in the fluid of which the flow has been created, irradiating the irradiation area with the laser beam from the side of the outer surface through the opening. This configuration can enhance the strength of the component.

The unprocessed component may have a cavity inside. The hole may extend from the opening to the cavity. In creating the flow of the fluid, the flow of the fluid may be oriented from the side of the outer surface toward the cavity. This configuration can avoid interference between the laser beam and air bubbles etc.

The unprocessed component may be provided with a plurality of holes. In creating the flow of the fluid, a pump that suctions the fluid may be connected to the cavity. At least one of the holes other than the hole that is to be irradiated with the laser beam may be masked. This configuration can reduce the amount of fluid energy lost through at least one hole.

In setting an irradiation area of the laser beam, the irradiation area of the laser beam may be set such that a plurality of spots are disposed in the inner surface along a circumferential direction of the hole, with each spot partially overlapping with and shifted by a predetermined amount from a preceding spot. In irradiating each of the spots with the laser beam, the spot that does not overlap with the spot having been irradiated last may be irradiated with the laser beam. This configuration can secure a time for air bubbles etc. to move away.

In irradiating with the laser beam, an irradiation condition of the laser beam with which the inner surface is irradiated may be varied in a circumferential direction of the hole. This configuration allows processing in a state where areas to which a compressive residual stress is to be imparted are adjusted.

The unprocessed component may have a shape of a cylinder having a cavity inside. The hole may extend from the opening to the cavity. In irradiating with the laser beam, the irradiation condition may be varied periodically in a circumferential direction of the hole. This configuration can impart a compressive residual stress so as to counteract a tensile stress that will occur.

The unprocessed component may have a first central axis. The hole may have a second central axis that has an origin at a point on the first central axis and extends along a radial direction of the unprocessed component orthogonal to the first central axis. In irradiating with the laser beam, the irradiation condition may be varied such that a compressive residual stress occurring in radial portions of the inner wall located at rotation angles of 45° and 225° in one circumferential direction of the hole from one radial direction of the hole becomes higher than a compressive residual stress occurring in radial portions of the inner wall located at rotation angles of 135° and 315° in the one circumferential direction from the one radial direction, the one radial direction being one of radial directions of the hole that are parallel to the first central axis among radial directions of the hole having an origin at a point on the second central axis and orthogonal to the second central axis. This configuration can reduce the processing time while enhancing the strength of the component.

A component according to a second aspect of the present disclosure has a hole having an opening in an outer surface of the component, and has a region in an inner wall of the hole in which a compressive residual stress decreases continuously from a vicinity of an inner surface of the hole to a predetermined depth. This configuration can enhance the strength of the component.

The component may have a shape of a cylinder having a cavity inside. The hole may extend from the opening to the cavity. The magnitude of the compressive residual stress in the inner wall may be distributed so as to vary periodically in a circumferential direction of the hole. This configuration can impart a compressive residual stress so as to counteract a tensile stress that will occur.

The component may have a first central axis. The hole may have a second central axis that has an origin at a point on the first central axis and extends along a radial direction of the component orthogonal to the first central axis. The compressive residual stress in radial portions of the inner wall located at rotation angles of 45° and 225° in one circumferential direction of the hole from one radial direction of the hole may be higher than the compressive residual stress in radial portions of the inner wall located at rotation angles of 135° and 315° in the one circumferential direction from the one radial direction, the one radial direction being one of radial directions of the hole that are parallel to the first central axis among radial directions of the hole having an origin at a point on the second central axis and orthogonal to the second central axis. This configuration can reduce the processing time while enhancing the strength of the component.

The present disclosure provides a component manufacturing method that can enhance the strength of a component, and a component having enhanced strength.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 25 is a view illustrating control factors, composite parameters, processing principles, and characteristic values of laser peening.

DETAILED DESCRIPTION OF EMBODIMENTS

The most preferred embodiments of the present disclosure will be described below with reference to the accompanying drawings. However, the present disclosure is not limited to the following embodiments. To clarify the illustration, the following description and the drawings are simplified as appropriate.

Embodiment 1

A component and a component manufacturing method according to Embodiment 1 will be described. First, the component will be described. Then, the component manufacturing method will be described.

Component

Figure 1:
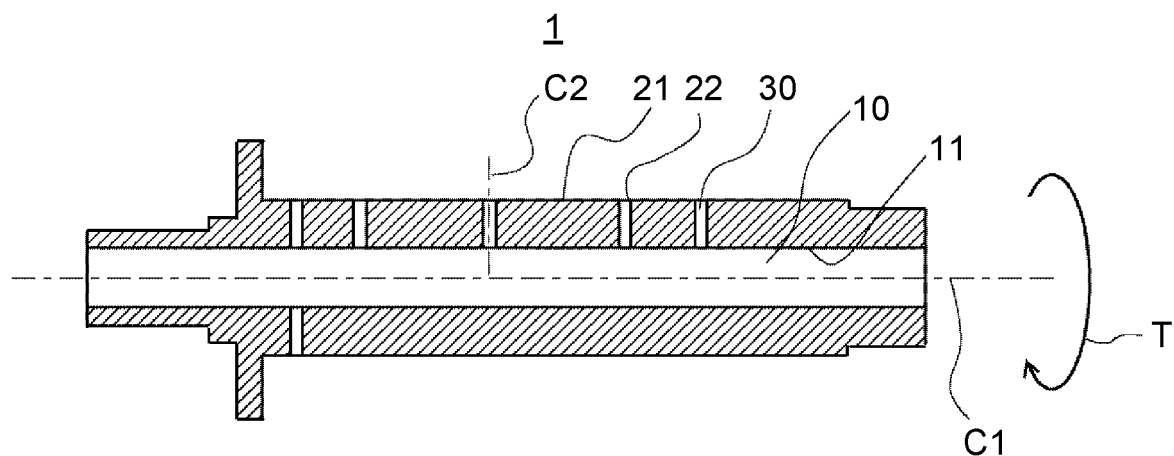
FIG. 1 is a sectional view illustrating a component according to Embodiment 1.

FIG. 1 is a sectional view illustrating a component according to Embodiment 1. As shown in FIG. 1, a component 1 has a shape of, for example, a cylinder having a cavity 10 inside. A circumferential surface in contact with the cavity 10 inside the component 1 is referred to as an inner surface 11. A circumferential surface on an outer side of the component 1 is referred to as an outer surface 21. The cylindrical component 1 has a central axis C1. The component 1 may be formed so as to rotate around the central axis C1 as the rotational axis. For example, the component 1 is rotated by an input torque T that rotates around the central axis C1 as the rotational axis.

The component 1 has a hole 30 that has an opening 22 in the outer surface 21. In the example shown in FIG. 1, a plurality of holes 30 is provided. For simplification, however, only one of these holes 30 is denoted by the reference sign in FIG. 1. For example, the hole 30 may extend from the inner surface 11 to the outer surface 21 of the component 1. In other words, the hole 30 extends from the opening 22 to the cavity 10. Alternatively, the hole 30 may be a recess formed as a non-through-hole. The hole 30 may have a central axis C2 that has an origin on the central axis C1 of the component 1 and extends along a radial direction of the component 1 orthogonal to the central axis C1. A direction around the central axis C1 as the center in a plane orthogonal to the central axis C1 is referred to as a circumferential direction. A direction around the central axis C2 as the center in a plane orthogonal to the central axis C2 is also referred to as a circumferential direction.

The component 1 has been described as a cylinder having the cavity 10 inside, but the component 1 is not limited to this example. Provided that the component 1 has the hole 30 that has the opening 22 in the outer surface 21, the component 1 may have a square cylindrical shape, columnar shape, or the like. The hole 30 is formed at a predetermined position of the component 1 so as to have a predetermined diameter.

For example, the component 1 is a shaft used in a drive unit of an automobile etc. The cavity 10 of the component 1 functions as a hollow lubricating oil flow passage. Industrial machines and automobiles have a shaft as a shaft structure that transmits power by the rotational torque T. The shaft is required to be highly reliable in terms of fatigue strength. On the other hand, the shaft is required to be reduced in size and weight. For the purpose of weight reduction, a hollow structure having the cavity 10 is adopted for some shafts.

In some cases, the hole 30 extending from the cavity 10 to the outer surface 21 is used as a lubricating oil path. For example, in an automatic transmission of an automobile, a lubricating oil hole 30 having a hole diameter of about $\phi$ 1 to 3 mm is formed in a cylindrical shaft having an outside diameter of about $\phi$ 12 to 40 mm and an inside diameter of the cavity 10 of about 10 mm. As the shaft rotates around the central axis C1 as the rotational axis, the lubricating oil having been supplied to the cavity 10 is supplied by a centrifugal force through the hole 30 to a periphery of the shaft. When the cavity 10 and the hole 30 are thus used as a lubricating oil path, lubricating oil can be supplied at a predetermined flow rate to the periphery of the component 1.

On the other hand, a part where the hole 30 is formed may have lowest strength in the shaft. When the torque T that rotates the shaft around the central axis as the center is exerted on the shaft, a shear stress occurs in a cross-section of the shaft orthogonal to the central axis. The stress occurring in the shaft may concentrate around the hole 30. In this case, a tensile stress occurs in a predetermined portion around the hole 30. In such a case, a decrease in the strength around the hole 30 limits the lifetime of the entire shaft.

In this embodiment, therefore, laser peening is performed on the hole 30 of the component 1. For example, laser peening is performed on the inner wall 32 of the hole 30 of the component 1. A compressive residual stress is thereby imparted to the inner wall 32 of the hole 30. Thus, the strength of the component 1 can be enhanced and the lifetime of the component 1 can be increased.

Figure 2:
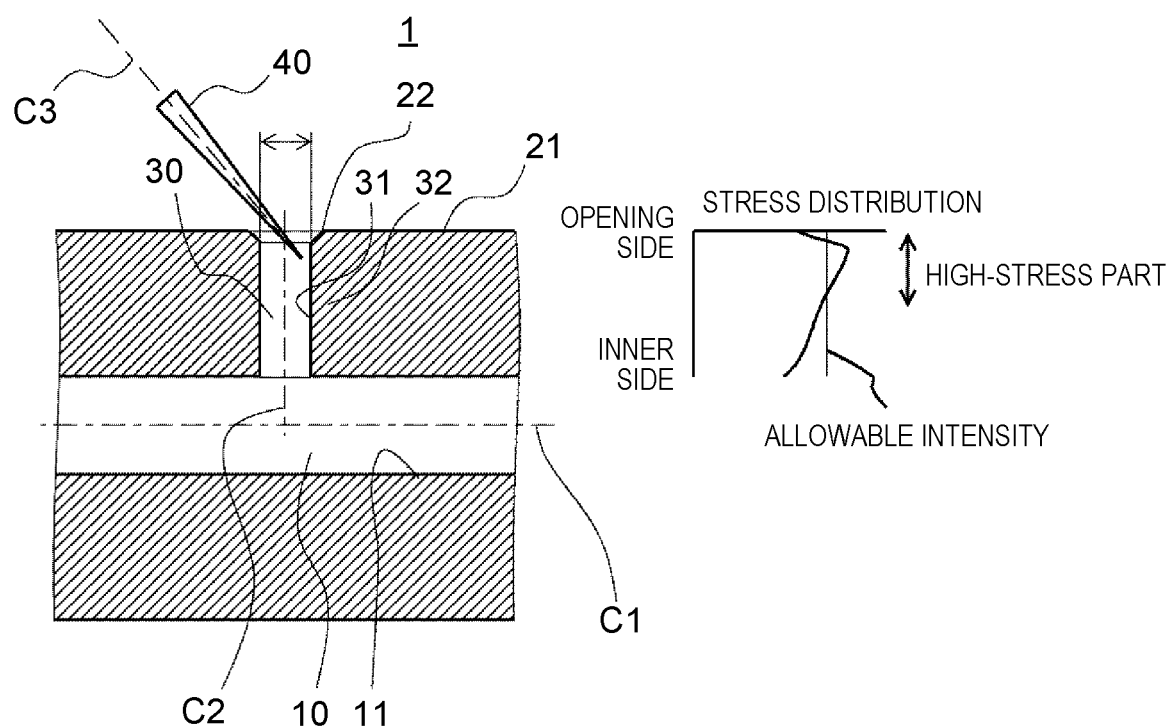
FIG. 2 is a sectional view illustrating a hole, undergoing laser peening, of the component according to Embodiment 1.

FIG. 2 is a sectional view illustrating the hole 30, undergoing laser peening, of the component 1 according to Embodiment 1. As shown in FIG. 2, it is difficult to perpendicularly irradiate the inner surface 31 of the hole 30 with a laser beam 40. Accordingly, the incident angle of an optical axis C3 of the laser beam 40 to the inner surface 31 is an angle larger than 0° and smaller than 90°. As the unit of angle, deg may also be used. The inner surface 31 of the hole 30 is irradiated with the laser beam 40 from the side of the outer surface 21 through the opening 22 of the hole 30.

A laser peening area in the inner wall 32 of the hole 30 is set based on the incident angle of the laser beam 40 to the inner surface 31 and on the chamfered shape of the corner between the outer surface 21 and the inner surface 31 of the hole 30. As shown in FIG. 2, the laser peening area in the inner wall 32 of the hole 30 is a high-stress part where a stress exceeding the allowable intensity occurs when the torque T is exerted on the component 1. Laser peening is performed on such a processing area. A compressive residual stress is thereby imparted to the inner wall of the hole 30. Here, the inner wall 32 refers to a part that includes the inner surface 31 of the hole 30 and surrounds the hole 30, and that has a thickness of a predetermined depth from the inner surface 31 in a radial direction orthogonal to the central axis C2.

Figure 3:
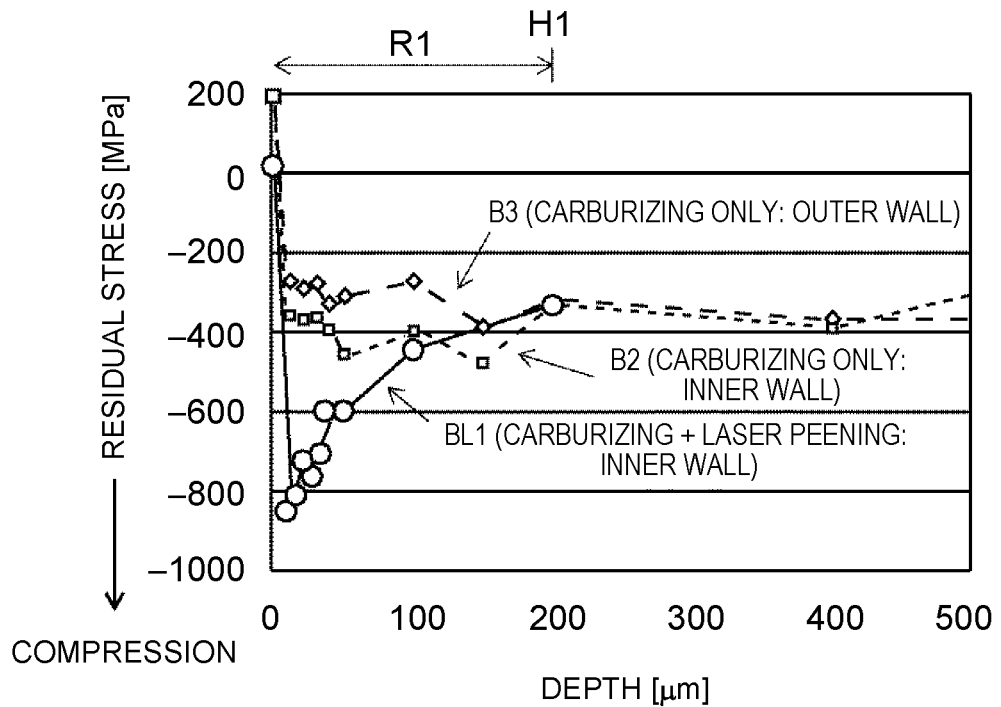
FIG. 3 is a graph illustrating a residual stress imparted to an inner wall of the hole of the component according to Embodiment 1, with the horizontal axis showing a depth from an inner surface and the vertical axis showing the residual stress.

FIG. 3 is a graph illustrating a residual stress imparted to the inner wall 32 of the hole 30 of the component 1 according to Embodiment 1, with the horizontal axis showing the depth from the inner surface 31 and the vertical axis showing the residual stress. The residual stress on the plus side of the vertical axis is a tensile stress, and the residual stress on the minus side of the vertical axis is a compressive stress. The depth from the inner surface 31 on the horizontal axis is the length from the inner surface 31 of the inner wall 32 in the radial direction orthogonal to the central axis C2. For reference, FIG. 3 also shows the residual stress in a part (outer wall) of the component 1 including the outer surface 21.

As shown in FIG. 3, the line "BL1" (circles) shows the resulting residual stress relative to the depth from the inner surface 31 in a case where a treatment BL1 consisting of carburizing and laser peening is performed on the inner wall 32 of the hole 30. The line "B2" (squares) shows the resulting residual stress relative to the depth from the inner surface 31 in a case where a treatment B2 consisting only of carburizing is performed on the inner wall 32 of the hole 30. The line "B3" (rhombuses) shows the resulting residual stress relative to the depth from the outer surface 21 in a case where a treatment B3 consisting only of carburizing is performed on the part (outer wall) including the outer surface 21. The depth from the outer surface 21 means the length of the part including the outer surface 21 in a direction from the outer surface 21 toward the central axis C1. Carburizing is a process of adding carbon to a surface layer to reinforce the surface layer. A stress remaining in the component 1 can be measured by X-ray diffraction (XRD).

As shown in FIG. 3, when the treatment BL1 consisting of carburizing and laser peening is performed on the inner wall 32 of the hole 30, a compressive residual stress is imparted to the part from the inner surface 31 to the depth of 200 μm. As the stress is released at the inner surface 31, the residual stress there is about zero. The compressive residual stress increases up to a point a few tens of μm immediately below the inner surface 31. This point a few tens of μm immediately below the inner surface 31 is also referred to as the vicinity of the inner surface 31. For example, the compressive residual stress is as high as about 850 MPa in the vicinity of the inner surface 31. The compressive residual stress in the inner wall 32 has the maximum value in the vicinity of the inner surface 31.

The compressive residual stress decreases continuously with the increasing depth from the inner surface 31 beyond the vicinity of the inner surface 31. For example, the compressive residual stress is 600 MPa in a cross-section at the depth of 50 μm from the inner surface 31. The compressive residual stress is 450 MPa in a cross-section at the depth of 100 μm from the inner surface 31. The compressive residual stress is 350 MPa in a cross-section at the depth of 200 μm from the inner surface 31.

Thus, the component 1 has a region R1 in the inner wall 32 of the hole 30 in which the compressive residual stress decreases continuously from the vicinity of the inner surface 31 of the hole 30 to a predetermined depth H1. For example, the predetermined depth H1 is 200 μm. It is presumed that the component 1 includes a region in a part deeper than the predetermined depth H1 in which the compressive residual stress is substantially constant.

In the region R1, the compressive residual stress decreases continuously. Thus, when attention is paid to the region R1, the compressive residual stress in the part from the vicinity of the inner surface 31 to the depth of 100 μm is higher than the compressive residual stress in the part from the depth of 100 to 200 μm.

On the other hand, when the treatment B2 consisting only of carburizing is performed on the inner wall 32 of the hole 30, the compressive residual stress has smaller values in the part from the vicinity of the inner surface 31 to the depth of about 100 μm than in the case of the treatment BL1. For example, the compressive residual stress is 450 MPa in a cross-section at the depth of 50 μm from the inner surface 31. The compressive residual stress is 400 MPa in a cross-section at the depth of 100 μm from the inner surface 31. The compressive residual stress is 450 MPa in a cross-section at the depth of 150 μm from the inner surface 31. The compressive residual stress is 350 MPa in a cross-section at the depth of 200 μm from the inner surface 31.

Thus, when the treatment B2 consisting only of carburizing is performed on the inner wall 32 of the hole 30, the compressive residual stress does not decrease continuously in the inner wall 32 of the hole 30 from the vicinity of the inner surface 31 of the hole 30 to the predetermined depth H1. Accordingly, in the case of the treatment B2 consisting only of carburizing, the compressive residual stress in the part from the vicinity of the inner surface 31 to the depth of 100 μm is not necessarily higher than the compressive residual stress in the part from the depth of 100 to 200 μm.

When the treatment B3 consisting only of carburizing is performed on the part (outer wall) of the component 1 including the outer surface 21 around the opening 22, the compressive residual stress has smaller values in the part from immediately below the outer surface 21 to the depth of about 200 μm than the compressive residual stresses in the case of the treatment BL1 and of the treatment B2. For example, the compressive residual stress is 300 MPa in a cross-section at the depth of 50 μm from the outer surface 21. The compressive residual stress is 280 MPa in a cross-section at the depth of 100 μm from the outer surface 21. The compressive residual stress is 400 MPa in a cross-section at the depth of 150 μm from the outer surface 21. The compressive residual stress is 350 MPa in a cross-section at the depth of 200 μm from the outer surface 21.

As shown in FIG. 3, when the treatment BL1 is compared with the treatment B2 and the treatment B3, the highest compressive residual stress is imparted in the vicinity of the inner surface 31 in the case of the treatment BL1. Moreover, the compressive residual stress in the part from the vicinity of the inner surface 31 to the depth of 200 μm in the case of the treatment BL1 is higher than the compressive residual stress in the part from the outer surface 21 to the depth of 200 μm in the case of the treatment B3.

Furthermore, the treatment BL1 is accompanied by the region R1 in the inner wall 32 of the hole 30 in which the compressive residual stress decreases continuously from the vicinity of the inner surface 31 of the hole 30 to the depth of 200 μm. On the other hand, the treatment B2 and the treatment B3 are not accompanied by such a region in which the compressive residual stress decreases continuously from the vicinity of the inner surface 31 or the outer surface 21 to the depth of 200 μm. In the case of the treatment BL1, within the region R1, the compressive residual stress in the part from the vicinity of the inner surface 31 to the depth of 100 μm (half the predetermined depth H1) is higher than the compressive residual stress in the part from the depth of 100 μm to 200 μm.

The predetermined depth H1 is not limited to the depth of 200 μm. For example, the predetermined depth H1 is the depth of the border between the region R1 and the region in which the compressive residual stress in the inner wall 32 has a substantially constant value. Alternatively, the predetermined depth H1 may be the depth of a part in which the compressive residual stress in the case of the treatment BL1 is higher than the compressive residual stress in the case of the treatment B3.

Figure 4:
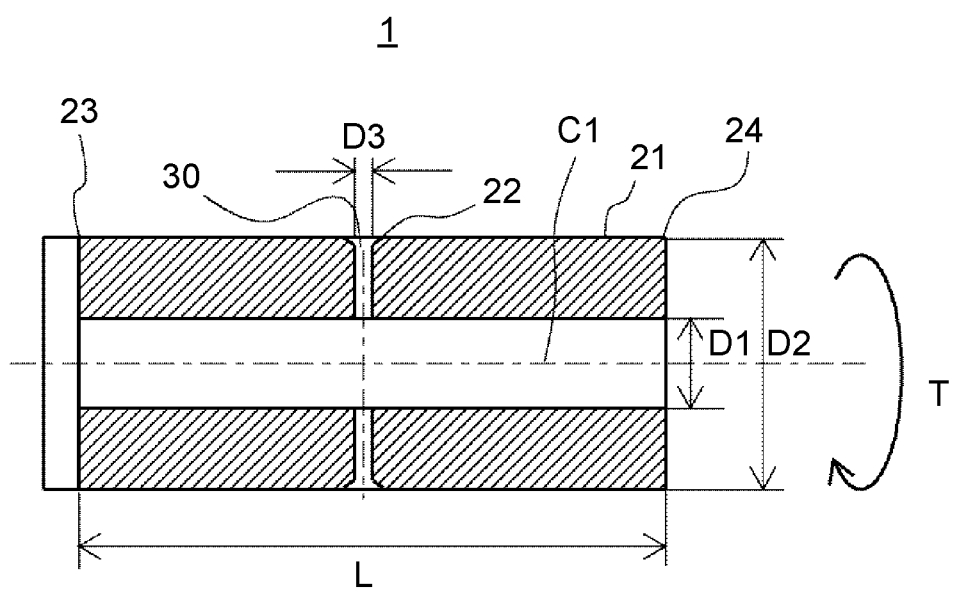
FIG. 4 is a view illustrating an analytical model for analyzing a stress occurring in the component.

FIG. 4 is a view illustrating an analytical calculation model for analyzing a stress occurring in the component 1. As shown in FIG. 4, the component 1 as an analytical model has a shape of a cylinder having the hole 30 that has the opening 22 in the outer surface 21. For example, the component 1 is a shaft. The hole 30 is formed at the middle of an overall length L of the component 1. A rim of the opening 22 of the hole 30 may be chamfered. One end 23 of the component 1 in the direction of the central axis C1 is fixed. A torsional torque T that rotates around the central axis C1 as the rotational axis is exerted on the other end 24 of the component 1. A stress occurring in the component 1 is analyzed using such a calculation model. The component 1 has an inside diameter D1 of, for example, ϕ 10 mm and an outside diameter D2 of, for example, φ 12 to 40 mm. The hole 30 has an inside diameter D3 of, for example, 1 to 3 mm.

Figure 5:
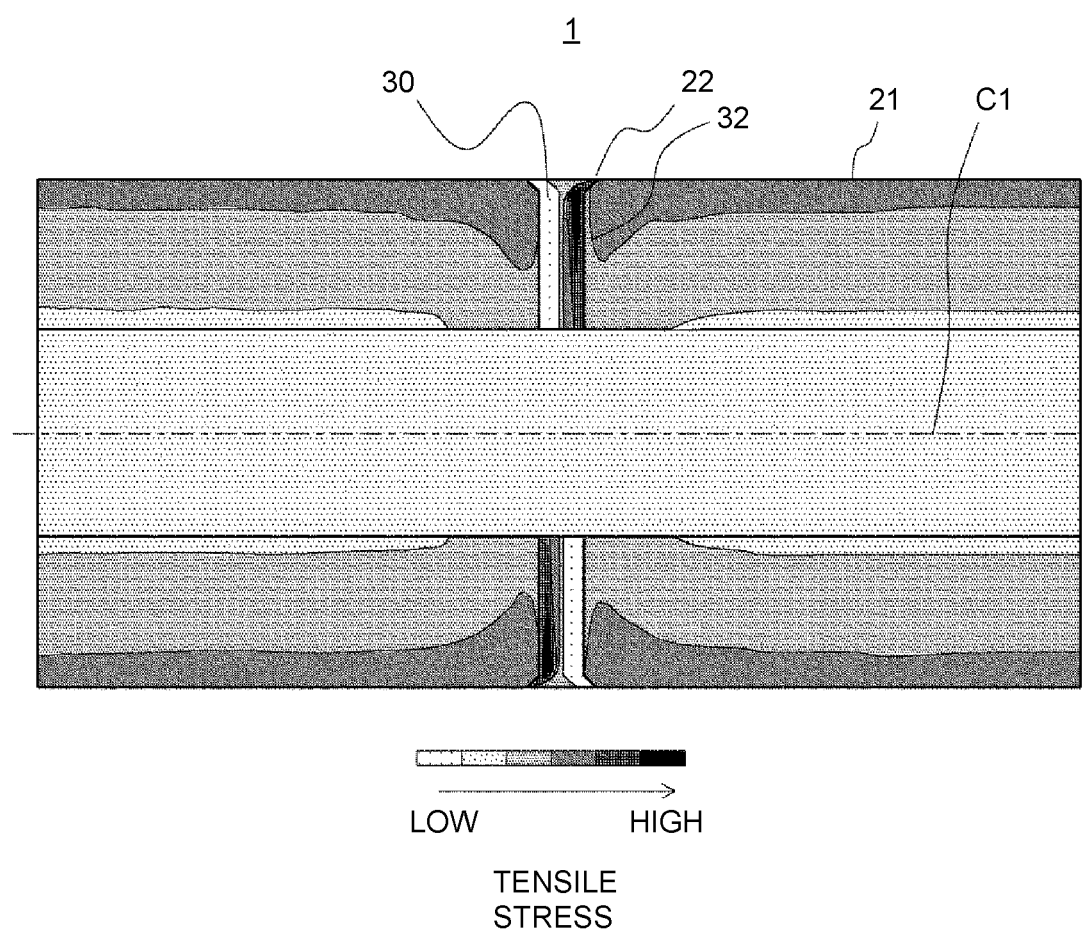
FIG. 5 is a view illustrating an analysis result of the stress occurring in the component.

FIG. 5 is a view illustrating an analysis result of the stress occurring in the component 1. As shown in FIG. 5, when the torsional torque T is exerted on the cylindrical component 1, a shear stress occurs in a cross-section orthogonal to the central axis C1 of the component 1. For example, as shown in FIG. 5, the resulting stress causes a tensile stress in the inner wall 32 of the hole 30. The darker the tone of the grayscale is, the higher the tensile stress indicated is. The tensile stress occurs so as to expand the hole 30. The inner wall 32 of the hole 30 is subjected to a higher tensile stress than the part including the outer surface 21 around the opening 22.

The tensile stress occurring in the component 1 is considered to cause a decrease in the strength of the component 1. In this embodiment, laser peening is performed on the inner wall 32 of the hole 30 that is subjected to a high tensile stress. A compressive residual stress can be thereby imparted to the inner wall 32 of the hole 30. Thus, the strength of the component 1 can be enhanced. In particular, the compressive residual stress is imparted so as to correspond to the distribution of the tensile stress that occurs when the torsional torque T is exerted on the component 1. Thus, the strength of the component 1 can be further enhanced. As a result, the lifetime of the component 1 can be increased.

Component Manufacturing Method

Figure 6:
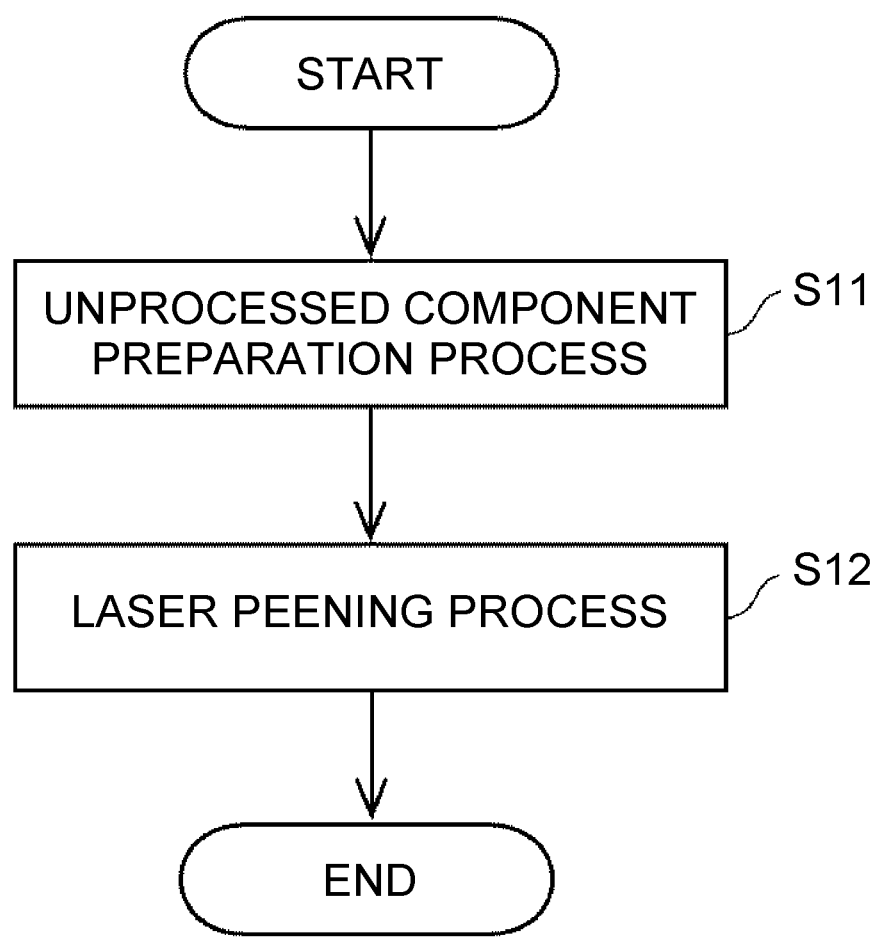
FIG. 6 is a flowchart illustrating a component manufacturing method according to Embodiment 1.
Figure 7:
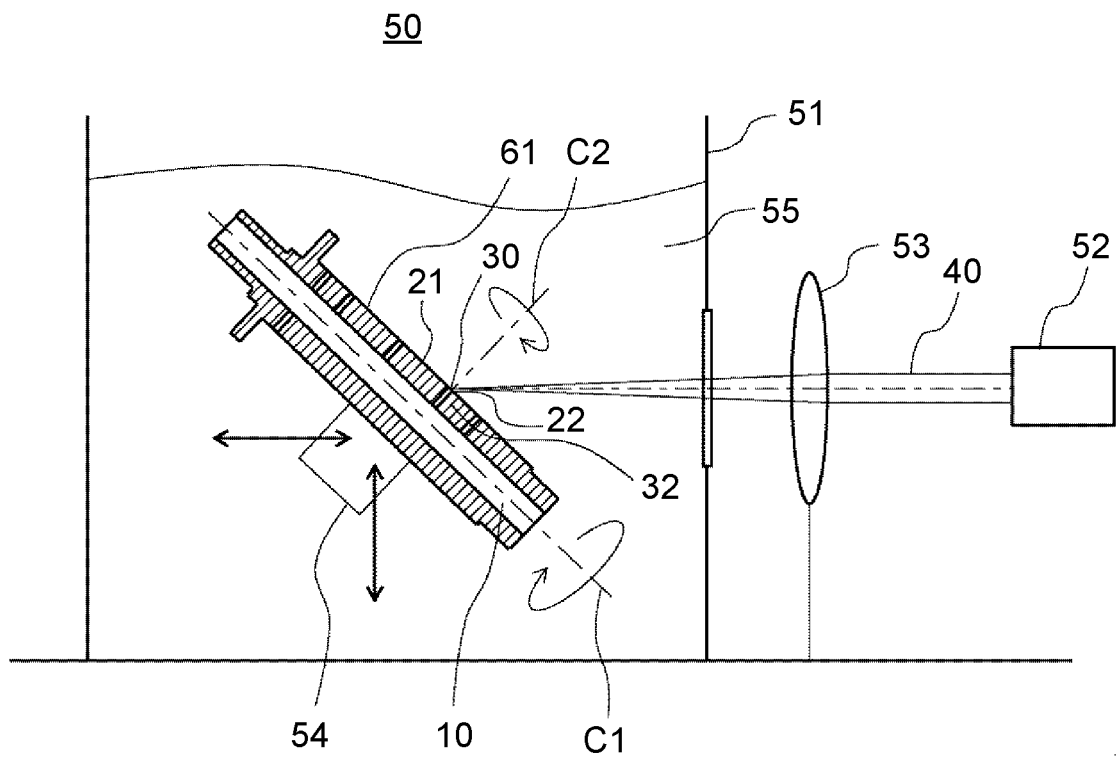
FIG. 7 is a view illustrating how a component is manufactured by the component manufacturing method according to Embodiment 1.

Next, a manufacturing method of the component 1 will be described. FIG. 6 is a flowchart illustrating the manufacturing method of the component 1 according to Embodiment 1. FIG. 7 is a view illustrating how the component 1 is manufactured by the manufacturing method of the component 1 according to Embodiment 1. As shown in FIG. 6, the manufacturing method of the component 1 includes a process of preparing an unprocessed component 61 (step S11) and a laser peening process (step S12). In the following, the manufacturing method of the component 1 will be described by dividing it into the process of preparing the unprocessed component 61 and the laser peening process.

Unprocessed Component Preparation Process

First, as shown in step S11 of FIG. 6 and FIG. 7, the unprocessed component 61 is prepared. The unprocessed component 61 is the component 1 before undergoing laser peening. The unprocessed component 61 becomes the component 1 by undergoing laser peening. The unprocessed component 61 has the same shape as the component 1. Specifically, the unprocessed component 61 has the hole 30 that has the opening 22 in the outer surface 21. In addition, the unprocessed component 61 has the cavity 10 inside. The hole 30 extends from the opening 22 to the cavity 10. The unprocessed component 61 may be provided with a plurality of holes 30. The unprocessed component 61 may have a cylindrical shape having the central axis C1, and the hole 30 may have the central axis C2 that has an origin on the central axis C1 and extends along a radial direction of the unprocessed component 61 orthogonal to the central axis C1.

Laser Peening Process: Processing Device

Next, as shown in step S12 of FIG. 6, the laser peening process is performed. The laser peening process is a process in which laser peening is performed on the unprocessed component 61 having the hole 30 that has the opening 22 in the outer surface 21 by irradiating the inner wall 32 of the hole 30 with the laser beam 40 in a fluid 55. To describe the laser peening process, a laser peening device will be described first. Details of laser peening using the laser peening device will be described thereafter.

As shown in FIG. 7, laser peening is performed, for example, by using a laser peening device 50. As shown in FIG. 7, the laser peening device 50 includes a water tank 51, a laser oscillator 52, an optical member 53, and a stage 54.

The water tank 51 holds the fluid 55 in which the unprocessed component 61 is immersed for laser peening. For example, the fluid 55 is water. However, provided that the fluid 55 does not absorb the laser beam 40 to such an extent as to make laser peening impossible, the fluid 55 may be other than water. The stage 54 that controls the position of the unprocessed component 61 may be provided in the water tank 51.

The stage 54 controls the positions of the unprocessed component 61 in a horizontal direction and a depth direction. The stage 54 may be rotated around the central axis C1 of the component 1 and the central axis C2 of the hole 30 as the rotational axes. The irradiation position of the laser beam 40 may be controlled by the stage 54.

The laser oscillator 52 oscillates the laser beam 40. The laser oscillator 52 emits the laser beam 40 to a part to be laser-peened of the unprocessed component 61. For example, the laser beam 40 is emitted to the inner surface 31 of the hole 30 of the unprocessed component 61. The laser beam 40 is emitted to a preset irradiation area in the inner surface 31. The laser oscillator 52 may oscillate the laser beam 40 in pulses. Thus, the laser beam 40 may be emitted in pulses to irradiate the unprocessed component 61 with the laser beam 40.

The laser peening device 50 may include the optical member 53 that guides the laser beam 40 to a predetermined irradiation area. The irradiation conditions of the laser beam 40 such as the spot diameter and the incident angle may be adjusted by using the optical member 53. The optical member 53 may have a mechanism such as a camera that detects the central axis C2 of the hole 30 of the unprocessed component 61.

Laser peening is performed on the unprocessed component 61 by using such a laser peening device 50.

Laser Peening Process: Details

Figure 8:
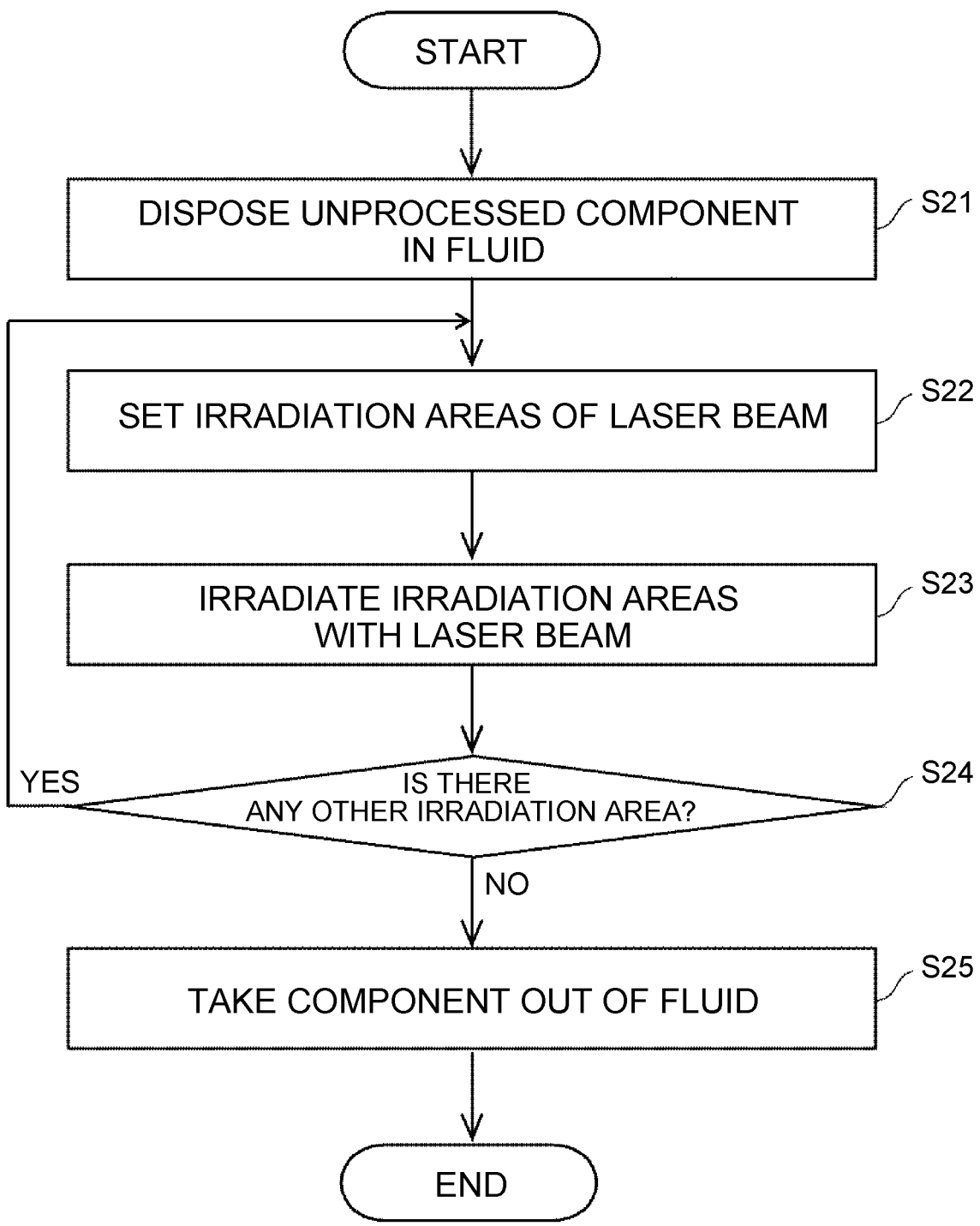
FIG. 8 is a flowchart illustrating a laser peening process according to Embodiment 1.

Next, the details of laser peening will be described. FIG. 8 is a flowchart illustrating the laser peening process according to Embodiment 1. First, as shown in step S21 of FIG. 8, the unprocessed component 61 is disposed in the fluid 55. Specifically, the unprocessed component 61 is disposed in the water tank 51 filled with the fluid 55. Then, the stage 54 is controlled so as to dispose the unprocessed component 61 at an appropriate position.

Next, as shown in step S22 of FIG. 8, the irradiation area of the laser beam 40 is set in the inner surface 31 of the hole 30. This setting of the irradiation area may instead be performed before the unprocessed component 61 is disposed in the fluid 55. Then, the optical member 53 is disposed at a predetermined position, or the stage 54 is controlled, so as to allow the irradiation area to be irradiated with the laser beam 40.

Next, as shown in step S23 of FIG. 8, the irradiation area is irradiated with the laser beam 40. Specifically, in the fluid 55, the irradiation area is irradiated with the laser beam 40 from the side of the outer surface 21 through the opening 22.

For example, the inner surface 31 of the hole 30 having an inside diameter of about 1 to 3 mm is irradiated with the laser beam 40. For example, a part of the inner surface 31 from the opening 22 to a point of 3 mm on the inner side of the hole 30 is irradiated with the laser beam 40 at an incident angle of 55°. The spot diameter of the laser beam 40 is set to, for example, 200 to 600 μm. The laser beam 40 may be pulsed. In this way, laser peening is performed on the inner wall 32 of the hole 30 of the unprocessed component 61.

Figures 9, 10:
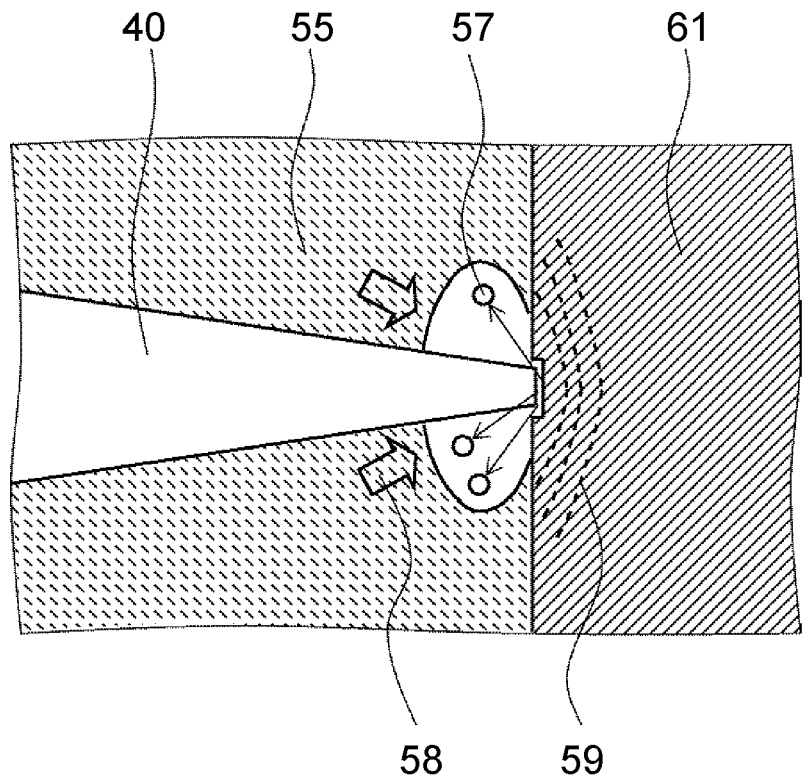
FIG. 9 is a view illustrating the principle of laser peening.
FIG. 10 is a view comparing shot peening and laser peening.

FIG. 9 is a view illustrating the principle of laser peening. As shown in FIG. 9, in laser peening, the unprocessed component 61 is irradiated with the high-power pulsed laser beam 40 (about several gigawatts/cm²) in the fluid 55. The surface of the unprocessed component 61 is thereby turned into plasma. Then, expansion of a generated plasma 57 is suppressed by a water pressure 58 of the surrounding fluid 55 to increase the pressure of the plasma. A reaction force to the plasma pressure is exerted on the surface of the unprocessed component 61. The resulting shockwaves cause a compressive residual stress 59 as plastic deformation. In this way, the compressive residual stress 59 can be imparted to the unprocessed component 61. As a result, the strength of the component 1 can be enhanced.

Next, as shown in step S24 of FIG. 8, it is determined whether there is any other irradiation area of the laser beam 40. When there is another irradiation area of the laser beam 40 (Yes), the process returns to step S22. Then, step S22 and step S23 are repeated.

On the other hand, when there is no other irradiation area of the laser beam 40 (No), as shown in step S25 of FIG. 8, the component 1 is taken out of the fluid 55. In this way, the component 1 can be manufactured by performing laser peening on the unprocessed component 61.

Next, effects of this embodiment will be described. The manufacturing method of the component 1 of this embodiment includes the laser peening process. Thus, it is possible to impart a compressive residual stress to the inner wall 32 of the hole 30 of the component 1 and thereby enhance the strength of the component 1.

FIG. 10 is a view comparing shot peening and laser peening. Shot peening is a method of imparting a residual stress to a surface of the component 1 by causing metal or non-metal small shot particles having a spherical shape to collide against a surface of the unprocessed component 61.

As shown in FIG. 10, both shot peening and laser peening can impart a compressive residual stress to the surface of the component 1 (A rating). However, shot peening is inferior in narrow-hole processability for processing the narrow hole 30 (B rating). This is because, for one thing, shot particles cannot reach the inner wall 32 when the hole 30 is a narrow hole (e.g., with an inside diameter of 1 to 3 mm). Even if the shot particles reach the inner wall 32 of the hole 30, the component of the velocity of the shot particles perpendicular to the inner wall 32 is small. In the first place, the shot particles cannot be caused to perpendicularly collide against the inner wall 32 of the hole 30. Accordingly, shot peening can impart only a low compressive residual stress.

In laser peening, by contrast, the plasma 57 is generated from the inner wall 32 if the inner wall 32 of the hole 30 can be irradiated with the laser beam 40. It is not necessary to perpendicularly irradiate the inner wall 32 of the hole 30 with the laser beam 40. Thus, the compressive residual stress 59 can be imparted to the inner wall 32 of the hole 30. Therefore, laser peening is excellent in narrow-hole processability for processing the narrow hole 30 (A rating).

In this embodiment, laser peening can be performed on the inner wall 32 of the hole 30 that is subjected to a high tensile stress. A compressive residual stress can be thereby imparted to the inner wall 32 of the hole 30. Shot peening, on the other hand, cannot impart a compressive residual stress to the inner wall 32 of the hole 30.

For example, the component 1 is irradiated with the laser beam 40 so as to have a region in the inner wall 32 of the hole 30 in which the compressive residual stress decreases continuously from the vicinity of the inner surface 31 to the predetermined depth H1 as shown in FIG. 3. For example, the predetermined depth H1 is 200 μm. This can be achieved, for example, by setting the energy density of the laser beam 40 with which the inner surface 31 of the hole 30 is irradiated to a sufficiently high density. Alternatively, the irradiation conditions may be adjusted such that, for example, the spot feed rate of the laser beam 40 with which the inner surface 31 of the hole 30 is irradiated is set to a sufficiently low rate.

Laser peening can impart a compressive residual stress such that the compressive residual stress occurring in the part of the inner wall 32 of the hole 30 from the inner surface 31 to the depth of 100 μm (half the predetermined depth H1) becomes higher than the compressive residual stress occurring in the part thereof from the depth of 100 μm to the depth of 200 μm (the predetermined depth H1). Thus, a tensile stress occurring when the torsional torque T is exerted on the component 1 can be counteracted, which can enhance the strength of the component 1. Laser peening can form such a distribution of a compressive residual stress. Carburizing cannot form such a distribution of a compressive residual stress.

Laser peening of this embodiment can simplify the configuration of the optical member 53, since the laser beam 40 is emitted from the side of the outer surface 21 of the component 1 through the opening 22. In comparison, laser peening described in JP 2006-322446 A makes the configuration of an optical member complicated, since a laser beam is emitted from inside an object being processed.

Modified Example

Next, a modified example of Embodiment 1 will be described. A laser peening device of this modified example includes a pump. First, the laser peening device used in this modified example will be described. Then, a laser peening process of the modified example will be described.

Figure 11:
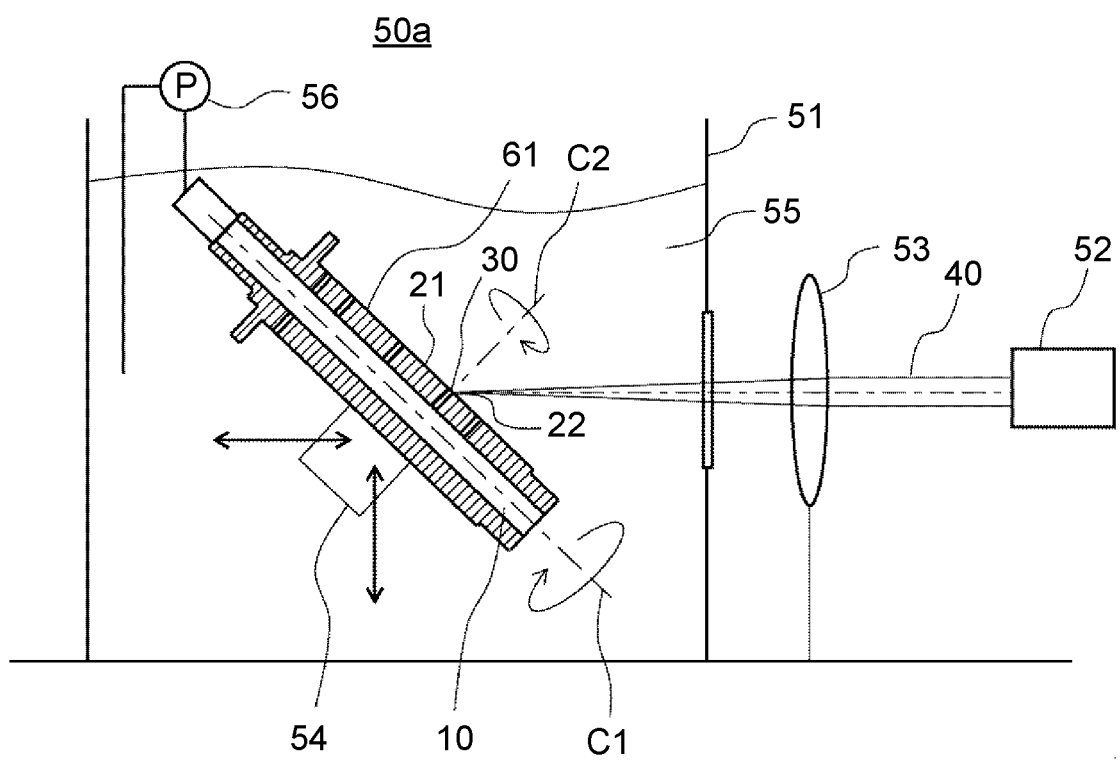
FIG. 11 is a view illustrating a laser peening device according to a modified example of Embodiment 1.

FIG. 11 is a view illustrating the laser peening device according to the modified example of Embodiment 1. As shown in FIG. 11, a laser peening device 50a includes a pump 56 that suctions or discharges the fluid 55.

In this modified example, the pump 56 is connected to the cavity 10 of the unprocessed component 61. Thus, the pump 56 creates a flow of the fluid 55 in the cavity 10. The hole 30 extends from the opening 22 to the cavity 10. As the pump 56 is actuated, a flow of the fluid 55 is created such that the fluid 55 flows along the hole 30.

When the pump 56 suctions the fluid, a negative pressure is created inside the hole 30. Thus, a flow of the fluid 55 oriented in a direction from the opening 22 to the cavity 10 is created. When the pump 56 discharges the fluid 55, a positive pressure is created inside the hole 30. Thus, a flow of the fluid 55 oriented in a direction from the cavity 10 to the opening 22 is created.

A flow of the fluid 55 is created by using the pump 56 such that air bubbles etc. resulting from laser peening flow along the hole 30. This can cause the air bubbles etc. to move away from the irradiation area of the laser beam 40. Thus, interference of the air bubbles etc. with the laser beam 40 with which the next irradiation area is irradiated can be avoided. Since the air bubbles etc. do not absorb the plasma pressure generated by the next laser beam 40, a variation in the compressive residual stress among the spots can be avoided.

Figure 12:
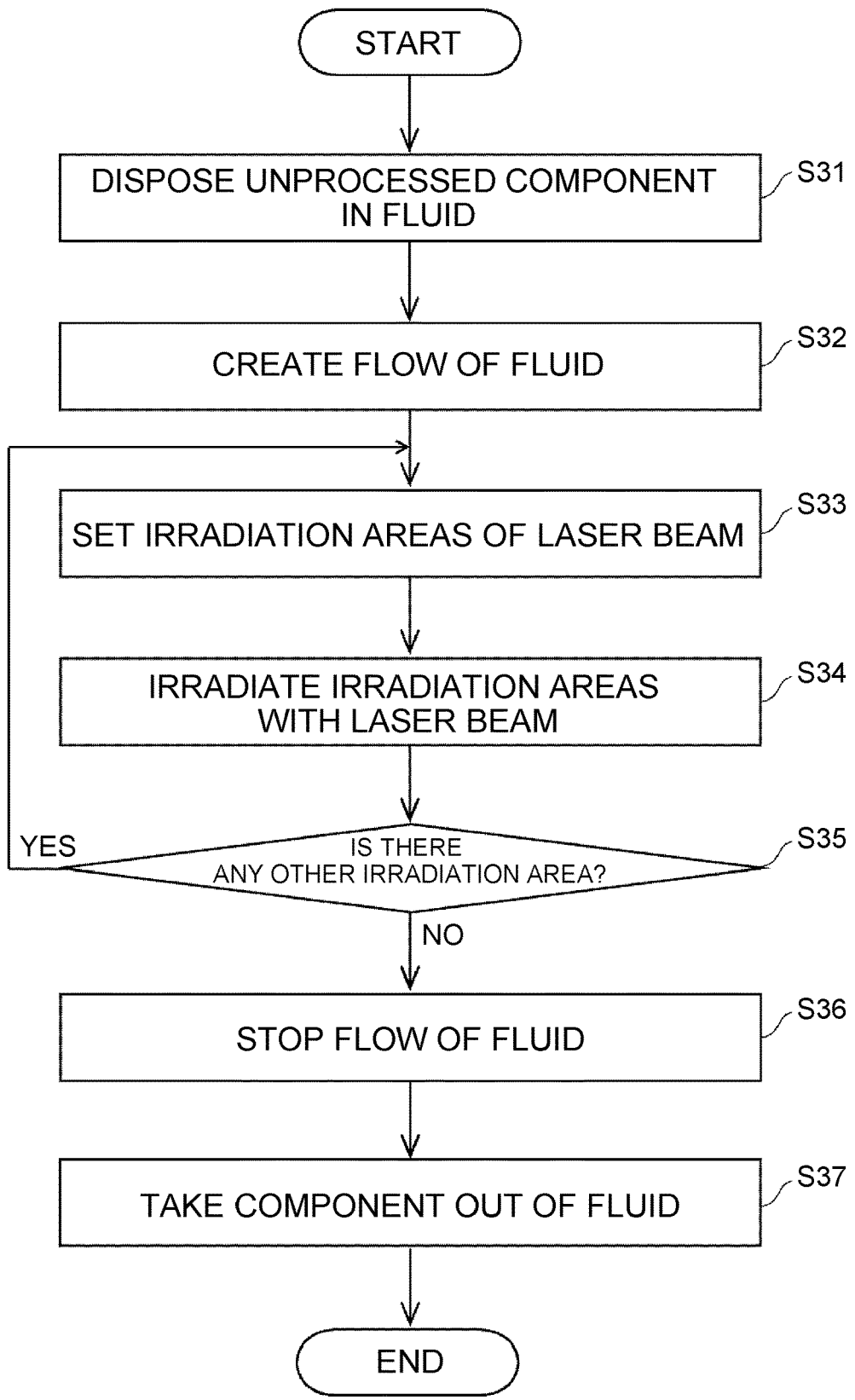
FIG. 12 is a flowchart illustrating a laser peening process according to the modified example of Embodiment 1.

Next, a laser peening process using the laser peening device 50a according to the modified example will be described. FIG. 12 is a flowchart illustrating the laser peening process according to the modified example of Embodiment 1.

As shown in step S31 of FIG. 12, the unprocessed component 61 is disposed in the fluid 55. Next, as shown in step S32 of FIG. 12, a flow of the fluid 55 is created. For example, a flow of the fluid 55 is created such that air bubbles etc. resulting from laser peening flow along the hole 30. Specifically, the pump 56 that suctions or discharges the fluid 55 is connected to the cavity 10. Then, the pump 56 is actuated so as to cause the fluid 55 to flow along the hole 30. The flow rate of the fluid 55 is controlled to a predetermined rate.

Provided that a flow of the fluid 55 can be created such that air bubbles etc. flow along the hole 30, other means than the pump 56, for example, a screw may be used to create a flow of the fluid 55. Moreover, provided that a flow of the fluid 55 is created such that air bubbles etc. flow along the hole 30, the hole 30 may be a non-through-hole. For example, a flow may be created such that the fluid 55 flows in and out of a recess of the non-through-hole through the opening 22.

Next, as shown in step S33 of FIG. 12, the irradiation area of the laser beam 40 is set. Then, as shown in step S34 of FIG. 12, the irradiation area is irradiated with the laser beam 40. In the case of the modified example, the irradiation area is irradiated with the laser beam 40 through the opening 22 in the fluid 55 of which the flow has been created.

Thereafter, as shown in step S35 of FIG. 12, it is determined whether there is any other irradiation area of the laser beam 40. When there is another irradiation area of the laser beam 40 (Yes), the process returns to step S33. Then, step S33 and step S34 are repeated. Steps S33 to S35 of FIG. 12 are the same as steps S22 to S24 of FIG. 6, and therefore detailed description thereof will be omitted.

On the other hand, when there is no other irradiation area of the laser beam 40 (No), the flow of the fluid 55 is stopped as shown in step S36 of FIG. 12. Specifically, for example, the pump 56 is stopped and the pump 56 is removed from the cavity 10.

Next, as shown in step S37 of FIG. 12, the component 1 is taken out of the fluid 55. In this way, the component 1 can be manufactured by performing laser peening on the unprocessed component 61.

Next, effects of this modified example will be described. In this modified example, air bubbles etc. resulting from laser peening can be caused to move away from the irradiation area along the direction of the central axis C2. Thus, the air bubbles etc. can be kept from entering an optical path of the laser beam 40.

In particular, a flow of the fluid 55 is created, for example, by the pump 56 in the state of suctioning the fluid. The flow of the fluid 55 is thereby oriented from the side of the outer surface 21 toward the cavity 10. In this case, the air bubbles etc. flow in a direction away from the laser beam 40 that is emitted from the side of the outer surface 21 through the opening 22. Thus, the air bubbles etc. can be further kept from entering the optical path of the laser beam 40. As a result, a decrease in the intensity of the laser beam 40, and a variation in the intensity of the laser beam 40 among the irradiation areas can be avoided.

The pump 56 that creates a flow of the fluid 55 is connected to the cavity 10 inside the component 1. Thus, the pump 56 that creates a flow of the fluid 55 is connected in a state of virtually sealing the component 1 other than the hole 30. This allows the fluid to flow at a sufficient velocity inside the hole 30.

By contrast, in the method of creating a flow of a fluid as described in JP 2009-074417 A, a fluid is injected into the hole 30 by a nozzle etc. from outside the component 1 that is a shaft etc. In the method of JP 2009-074417 A, the nozzle is disposed at a position far away from the hole 30. Thus, the fluid cannot flow at a sufficient velocity inside the hole 30. Accordingly, air bubbles etc. cannot be sufficiently moved away from the spot of the laser beam 40. Other effects of this modified example are included in the effects described in Embodiment 1.

Embodiment 2

Figure 13:
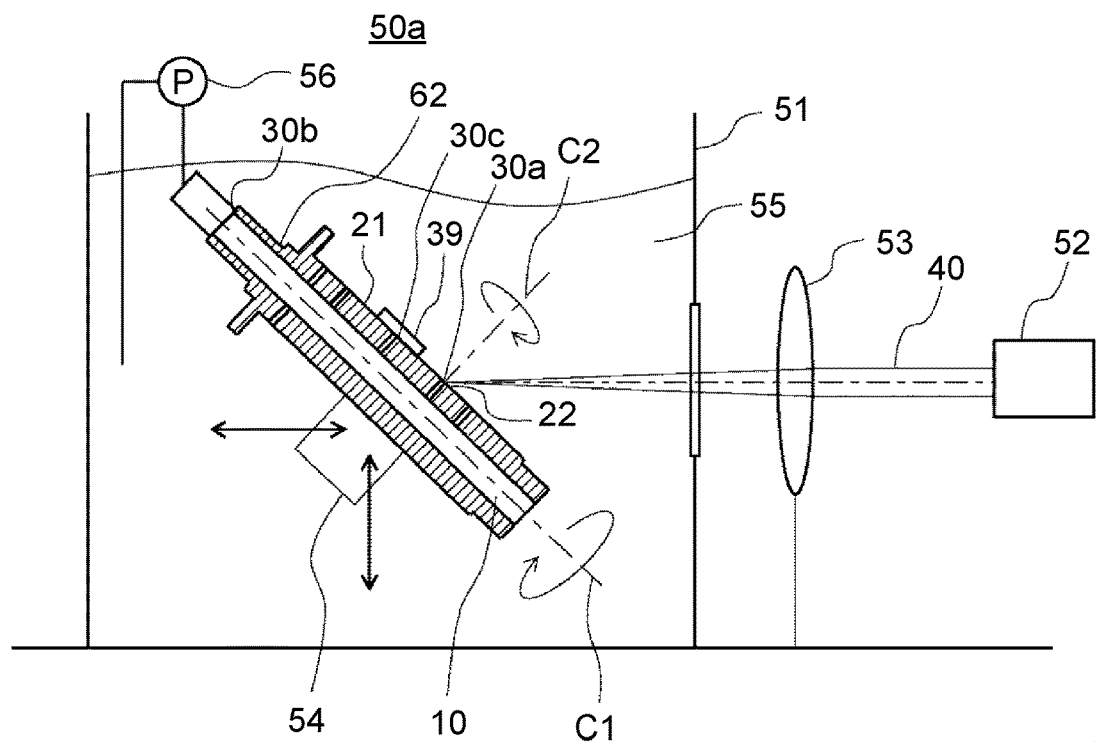
FIG. 13 is a view illustrating a component manufacturing method according to Embodiment 2.

Next, Embodiment 2 will be described. FIG. 13 is a view illustrating a component manufacturing method according to Embodiment 2. As shown in FIG. 13, an unprocessed component 62 of this embodiment has a plurality of holes 30. In the process of creating a flow of the fluid 55, at least one hole 30c other than a hole 30a that is to be irradiated with the laser beam 40 is masked.

For example, the unprocessed component 62 has a plurality of holes 30 including the hole 30a on which laser peening is performed, a hole 30b to which the pump 56 is connected, and at least one other hole 30c. Laser peening is performed in a state where the at least one hole 30c is masked with a mask 39.

Next, effects of this embodiment will be described. According to this embodiment, in the case where laser peening is performed on the unprocessed component 62 having a plurality of the holes 30, the amount of fluid energy generated by the pump 56 that is lost through the at least one hole 30c can be reduced. The hole 30c is masked to prevent the pressure inside the cavity 10 created by the pump 56 from escaping. Thus, the efficiency of the pump 56 can be increased and the pump 56 can be downsized. Other effects of this embodiment are included in the effects described in Embodiment 1 and the modified example.

Embodiment 3

Figure 14:
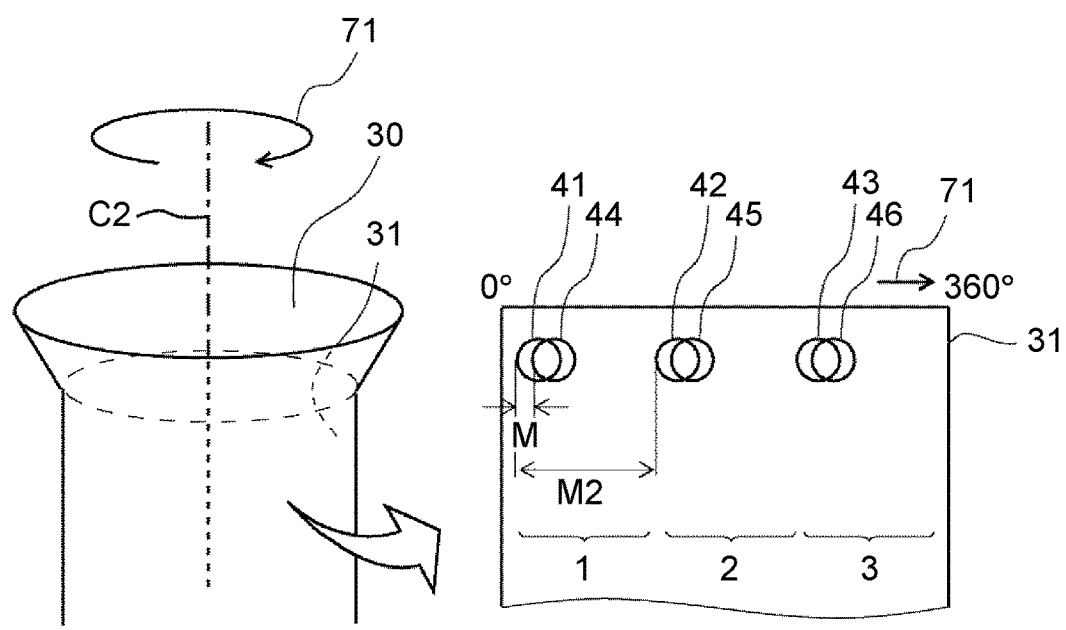
FIG. 14 is a view illustrating spots of a laser beam in laser peening according to Embodiment 3.

Next, Embodiment 3 will be described. In this embodiment, the spots of the laser beam 40 are irradiated at predetermined intervals in the process of irradiating the inner wall 32 of the hole 30 with the laser beam 40. FIG. 14 is a view illustrating the spots of the laser beam 40 in laser peening according to Embodiment 3, and FIG. 15 is a view illustrating spots of the laser beam 40 in laser peening according to a comparative example.

Figure 15:
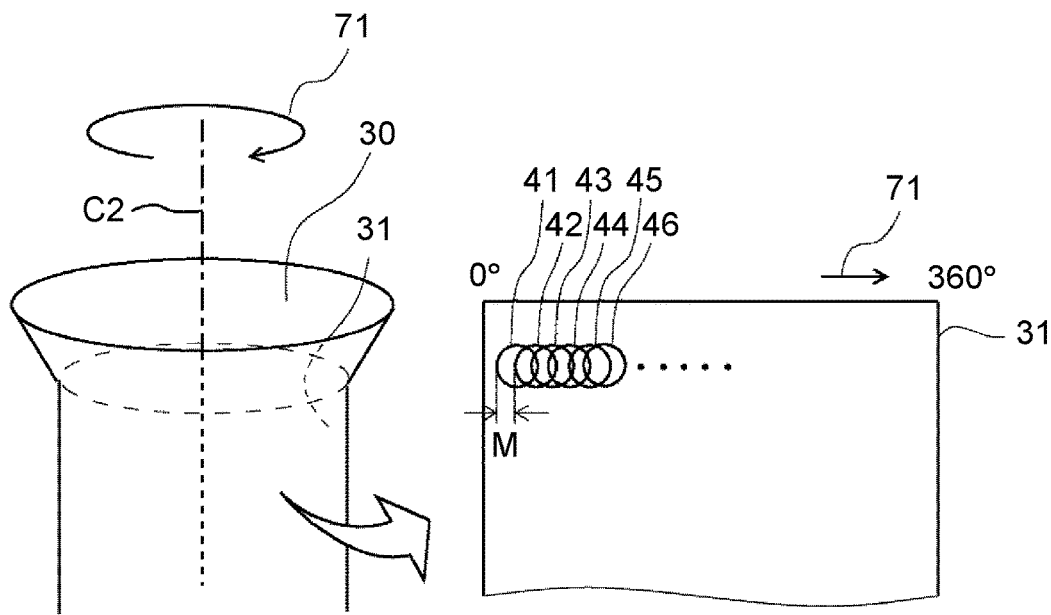
FIG. 15 is a view illustrating spots of a laser beam in laser peening according to a comparative example.

For example, in the process of setting the irradiation area of the laser beam 40, as shown in FIG. 15, a plurality of spots 41 to 46 of the laser beam 40 is set at such positions that the spots are disposed in the inner surface 3 of the hole 30 along a circumferential direction 71 of the hole 30, with each spot partially overlapping with and shifted by a predetermined amount from the preceding spot. In the process of irradiating with the laser beam, as shown in FIG. 14, each of the set spots is irradiated with the laser beam 40 in such a manner that the position of the spot 42 that does not overlap with the position of the spot 41 having been irradiated last is irradiated with the laser beam 40. The predetermined amount by which the spots are shifted is not limited to a constant amount. This predetermined amount is set based on the irradiation conditions such as the spot diameter and the spot feed rate.

As an example, as shown in FIG. 15, a case is considered here in which the entire circumference of 360° of the inner surface 31 of the hole 30 in the circumferential direction 71 is set as the irradiation area, and 72 spots are to be irradiated with the laser beam 40. In this case, a spot pitch M is 360[°]/72=5[°]. Therefore, the spots are set such that each spot partially overlaps with, and is shifted by the spot pitch M of 5° in the circumferential direction 71 from, the preceding spot.

In the comparative example, as shown in FIG. 15, such irradiation area is irradiated with the laser beam 40, with the spots 41 to 46 shifted by the spot pitch M=5[°] in the circumferential direction 71. These spots partially overlap with one another. In this embodiment, as shown in FIG. 14, n segment regions are irradiated with the laser beam 40 in turns such that the spot being irradiated does not overlap with the spot having been irradiated last.

Specifically, suppose that n is three as shown in FIG. 14. In this case, the second spot 42 is shifted by a spot pitch M2 (360[°]/3)=120[°] in the circumferential direction 71. The third spot 43 is also shifted by the spot pitch M2 of 120° in the circumferential direction 71. Then, the fourth spot 44 is shifted by the spot pitch M+the spot pitch M2=5[°]+120[°] =125[°] in the circumferential direction 71. The fifth and sixth spots 45, 46 are shifted by the spot pitch M2 of 120° in the circumferential direction 71.

Thus, in this embodiment, the n segment regions are irradiated with the laser beam 40 in turns. The spot pitch of (n+1)th, (2n+1)th, (3n+1)th . . . spots is M+(360[°]/n). The spot pitch of other spots is (360[20]/n). In this way, the spot (e.g., the spot 42) that does not overlap with the spot (e.g., the spot 41) having been irradiated last can be irradiated with the laser beam 40. Thus irradiating all the spots of the laser beam 40 can complete irradiation of the set irradiation areas.

Next, effects of this embodiment will be described. In this embodiment, the spot that does not overlap with the spot having been irradiated last is irradiated with the laser beam 40. This can secure a time for air bubbles etc. occurring from the spot having been irradiated last to move away from that spot. Thus, interference between the laser beam 40 and the air bubbles etc. can be avoided.

On the other hand, in the comparative example, the spots are irradiated in such a manner that the spot being irradiated is shifted from and partially overlaps with the preceding spot in the direction along the circumferential direction 71 as shown in FIG. 15. In the case of the comparative example, the part of the spot that overlaps with the spot having been irradiated last is irradiated with the laser beam 40. Thus, before the air bubbles etc. occurring from the spot having been irradiated last move away from that spot, the next spot is irradiated with the laser beam 40.

That is, since the spots 41 to 46 that are consecutive in chronological order overlap with one another, the air bubbles etc. cannot move away before the next spot is irradiated with the laser beam 40. Thus, the laser beam 40 and the air bubbles etc. interfere with each other. This results in a decrease in the intensity of the laser beam 40 with which the inner wall 32 is irradiated, and in a variation in the compressive residual stress imparted. Other effects of this embodiment are included in the effects described in Embodiment 1, the modified example, and Embodiment 2.

To implement this embodiment, the method of Embodiment 1 that does not involve creating a flow of the fluid 55 may be used, or the method of the modified example of Embodiment 1 that involves creating a flow of the fluid 55 may be used. When the method of the modified example of Embodiment 1 is used, the flow direction of the fluid 55 is oriented in the direction of the central axis C2 of the hole 30. It is therefore preferable that the last spot is located on the circumferential direction 71 orthogonal to the central axis C2. Thus, interference of the laser beam 40 with air bubbles etc. can be avoided, even when the air bubbles etc. move in the direction of the central axis C2 due to the flow of the fluid 55.

This embodiment may be implemented in a state where at least one hole 30 of the plurality of holes 30 is masked as in Embodiment 2.

Embodiment 4

Next, Embodiment 4 will be described. In this embodiment, in the process of irradiating with the laser beam 40, the irradiation conditions such as the spot diameter of the laser beam 40 with which the inner surface 31 is irradiated are varied in the circumferential direction 71 of the hole 30. First, a component 4 of this embodiment will be described. Then, a laser peening process of this embodiment will be described.

Figure 16:
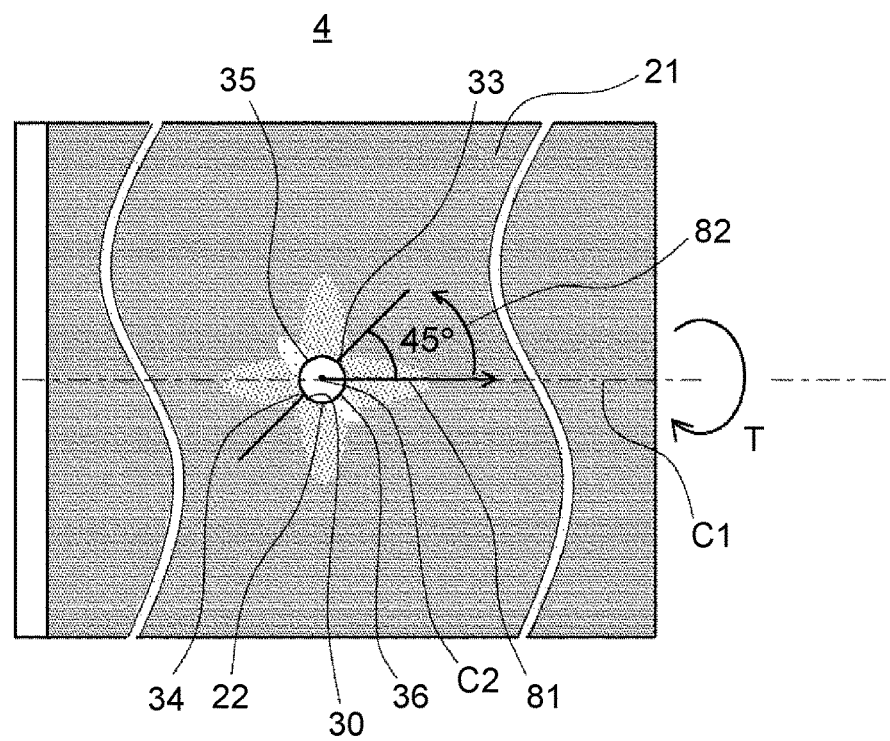
FIG. 16 is a view illustrating an analysis result of a stress occurring in a component according to Embodiment 4.
Figure 17:
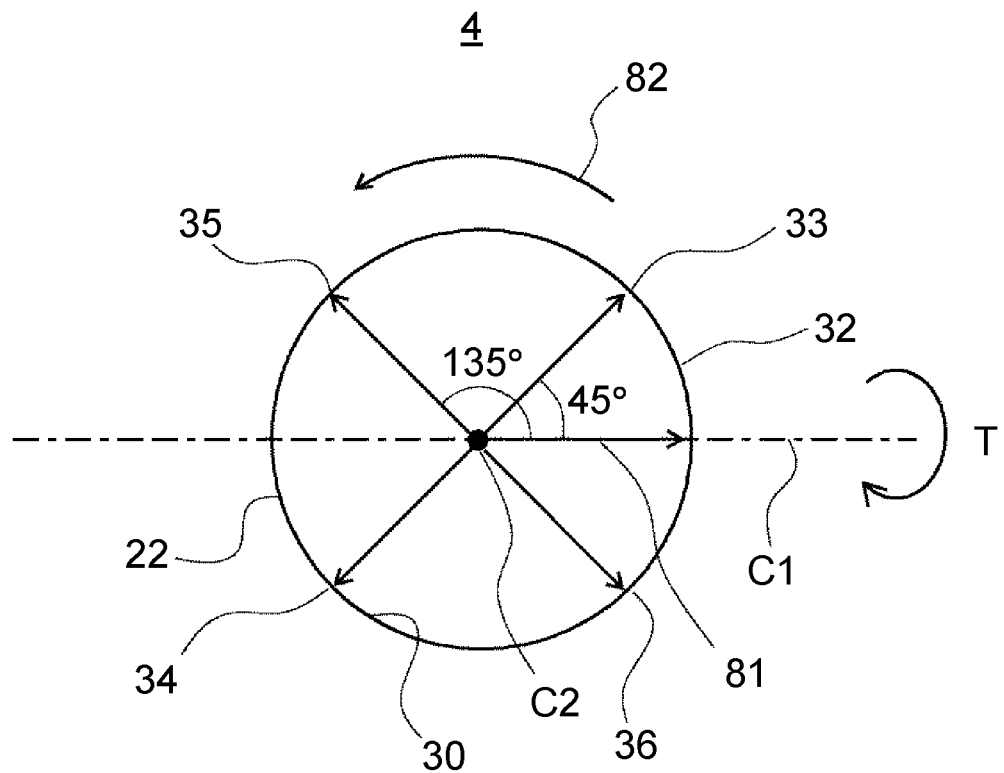
FIG. 17 is an enlarged view illustrating a hole of the component according to Embodiment 4.

FIG. 16 is a view illustrating an analysis result of a stress occurring in the component 4 according to Embodiment 4. FIG. 16 is a view of the hole 30 as seen from the side of the outer surface 21. The darker the tone of the grayscale is, the higher the tensile stress indicated is. FIG. 17 is an enlarged view illustrating the hole 30 of the component 4 according to Embodiment 4.

As shown in FIG. 16 and FIG. 17, when the torsional torque T acting around the central axis C1 as the rotational axis is exerted on the shaft-like cylindrical component 4, a shear stress occurs in a cross-section of the component 4 orthogonal to the central axis C1. The resulting stress causes a tensile stress in the inner wall of the hole 30 that acts so as to expand the hole 30.

This tensile stress concentrates at predetermined high-tension portion 33 and high-tension portion 34 of the inner wall 32 of the hole 30. The high-tension portion 33 and the high-tension portion 34 of the inner wall 32 are defined as follows: One of radial directions of the hole 30 that are parallel to the central axis C1 among radial directions of the hole 30 having an origin on the central axis C2 and orthogonal to the central axis C2 is referred to as a radial direction 81. One of circumferential directions around the central axis C2 as the center is referred to as a circumferential direction 82. In this case, the high-tension portion 33 is a radial portion of the inner wall 32 located at the rotation angle of 45° in the circumferential direction 82 from the radial direction 81. The high-tension portion 34 is a radial portion of the inner wall 32 located at the rotation angle of 225° in the circumferential direction 82 from the radial direction 81. The rotation direction of the circumferential direction 82 is determined by the rotation direction of the torque T.

On the other hand, a radial portion of the inner wall 32 located at the rotation angle of 135° in the circumferential direction 82 from the radial direction 81 is referred to as a low-tension portion 35. A radial portion of the inner wall 32 located at the rotation angle of 315° in the circumferential direction 82 from the radial direction 81 is referred to as a low-tension portion 36. The tensile stress in the low-tension portion 35 and the low-tension portion 36 is lower than the tensile stress in the high-tension portion 33 and the high-tension portion 34. In this embodiment, therefore, laser peening is performed on the high-tension portion 33 and the high-tension portion 34 in which a high tensile stress occurs when the torsional torque T is exerted on the component 4. Thus, the strength of the component 4 is enhanced.

Figure 18:
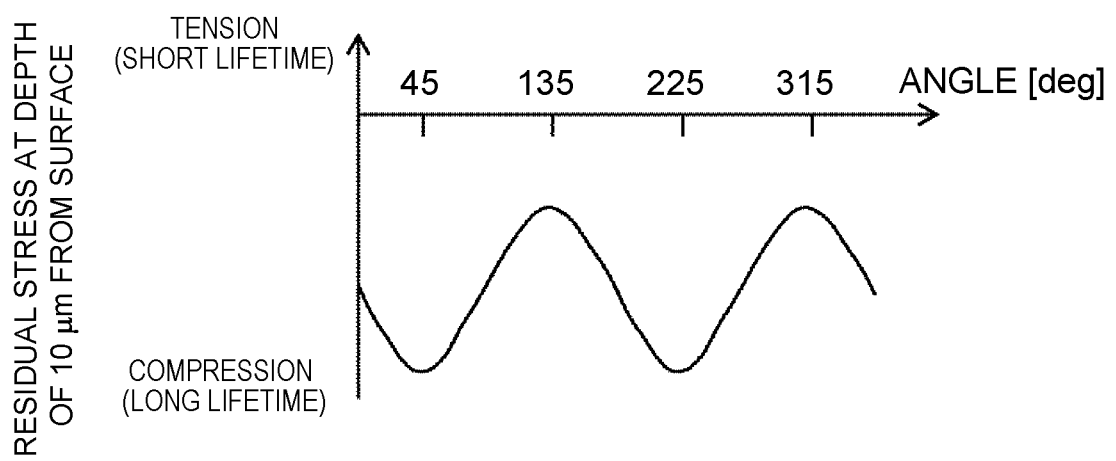
FIG. 18 is a graph illustrating a residual stress imparted to an inner wall of the component according to Embodiment 4, with the horizontal axis showing the position in the inner wall represented by a rotation angle in a circumferential direction of the hole, and the vertical axis showing the residual stress at the depth of 10 μm from an inner surface.

FIG. 18 is a graph illustrating a residual stress imparted to the inner wall 32 of the component 4 according to Embodiment 4, with the horizontal axis showing the position in the inner wall 32 represented by the rotation angle in the circumferential direction 82 of the hole 30, and the vertical axis showing the residual stress in the part at the depth of 10 μm from the inner surface 31. The residual stress on the upper side of the vertical axis shows a tensile stress, and the residual stress on the lower side of the vertical axis shows a compressive stress. A compressive stress imparted means an increase in lifetime.

As shown in FIG. 18, in the component 4 of this embodiment, the compressive residual stress in the high-tension portion 33 and the high-tension portion 34 is higher than the compressive residual stress in the low-tension portion 35 and the low-tension portion 36. The high-tension portion 33 and the high-tension portion 34 are radial portions of the inner wall 32 located at the rotation angles of 45° and 225°, respectively, in the circumferential direction 82 from the radial direction 81. The low-tension portion 35 and the low-tension portion 36 are radial portions of the inner wall 32 located at the rotation angles of 135° and 315°, respectively.

When the torsional torque T is exerted on the component 4, the high-tension portion 33 and the high-tension portion 34 subjected to a high tensile stress and the low-tension portions 35, 36 subjected to a low tensile stress are formed in the inner wall 32 of the hole 30 in the circumferential direction 82 of the hole 30. In other words, a distribution of the magnitude of the tensile stress occurs in the circumferential direction 82 of the hole 30. In the component 4 of this embodiment, therefore, the magnitude of the compressive residual stress has such a distribution that the magnitude varies in the circumferential direction 82 of the hole 30 so as to correspond to the distribution of the magnitude of the tensile stress in the circumferential direction 82 of the hole 30. For example, in the case of the distribution in which the magnitude of the tensile stress varies periodically in the circumferential direction 82 of the hole 30, the magnitude of the compressive residual stress in the inner wall 32 is distributed so as to vary periodically in the circumferential direction 82 of the hole 30. Thus, the component 4 of this embodiment can counteract a tensile stress that has occurred, which can enhance the strength of the component 4.

Next, a laser peening process of this embodiment will be described. The laser peening process of this embodiment is performed such that the magnitude of the compressive residual stress imparted to the inner wall 32 is distributed so as to vary in the circumferential direction 82 of the hole 30.

Figure 19:
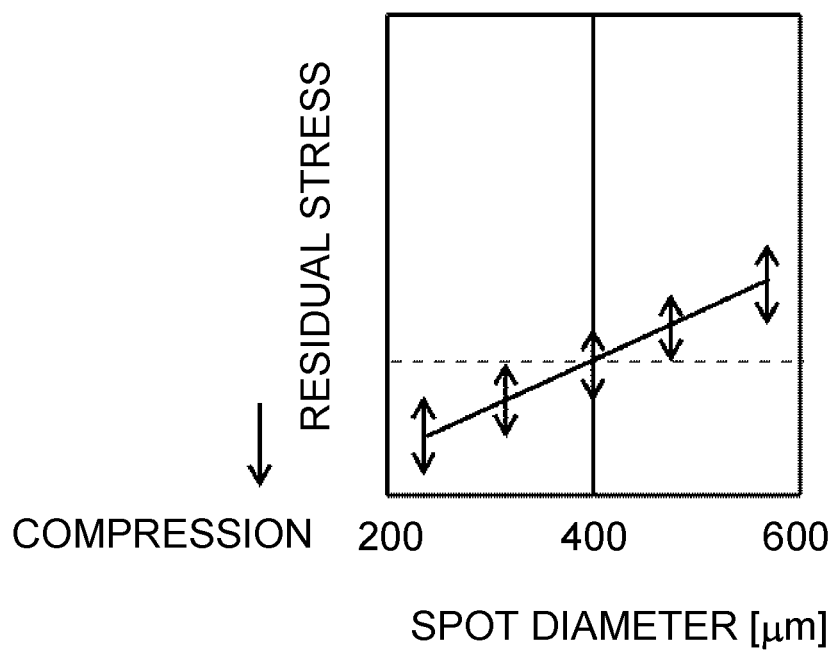
FIG. 19 is a graph illustrating a relationship between a spot diameter and a residual stress according to Embodiment 4, with the horizontal axis showing the spot diameter and the vertical axis showing the residual stress.
Figure 20:
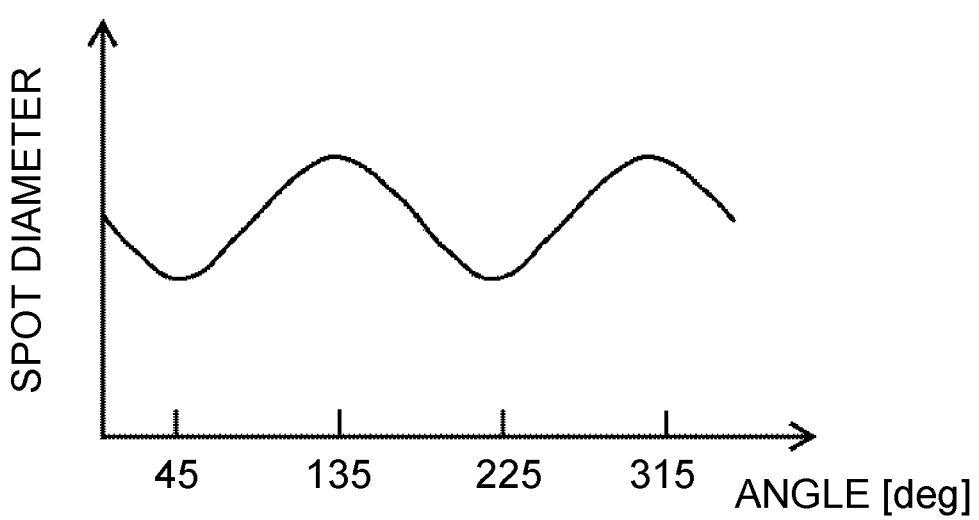
FIG. 20 is a graph illustrating a spot diameter of a laser beam in a laser peening process according to Embodiment 4, with the horizontal axis showing the position in the inner wall represented by the rotation angle in the circumferential direction of the hole, and the vertical axis showing the spot diameter of the laser beam.

FIG. 19 is a graph illustrating a relationship between a spot diameter and a residual stress according to Embodiment 4, with the horizontal axis showing the spot diameter and the vertical axis showing the residual stress. FIG. 20 is a graph illustrating the spot diameter of the laser beam 40 in the laser peening process according to Embodiment 4, with the horizontal axis showing the position in the inner wall 32 represented by the rotation angle in the circumferential direction 82 of the hole 30 and the vertical axis showing the spot diameter of the laser beam.

As shown in FIG. 19, laser peening with a smaller spot diameter can impart a higher compressive residual stress to the inner wall 32. As shown in FIG. 20, in the process of irradiating with the laser beam 40, the spot diameter of the laser beam 40 with which the inner surface 31 is irradiated is varied in the circumferential direction 82 of the hole 30. For example, the spot diameter of the laser beam 40 with which the inner surface 31 is irradiated is varied periodically in the circumferential direction 82 of the hole 30.

Specifically, the spot diameter of the laser beam 40 with which the high-tension portion 33 and the high-tension portion 34 are irradiated is set to be smaller than the spot diameter of the laser beam 40 with which the low-tension portion 35 and the low-tension portion 36 are irradiated. Thus varying the spot diameter according to the irradiation area can vary the compressive residual stress so as to be higher in the high-tension portion 33 and the high-tension portion 34 than in the low-tension portion 35 and the low-tension portion 36.

In the case where the component 4 that is a shaft etc. is used in an automatic transmission, for example, there are two main patterns of the component 4 rotating around the central axis C1 as the rotational axis. One pattern is a pattern where the component 4 is virtually coupled in series with an engine, and therefore the component 4 rotates in only one direction around the central axis C1 as the rotational axis (first pattern). The other pattern is a pattern where the component 4 is located on a power transmission path downstream of a gear having a reversing function, and the component 4 rotates around the central axis C1 as the rotational axis in two directions of normal and reverse rotations (second pattern).

In the case of the first pattern, in a situation where engine braking is used (the tires are rotating the engine), a high tensile stress occurs in the low-tension portion 35 and the low-tension portion 36 in which the compressive residual stress is low. However, the load of this tensile stress is negligibly low compared with the torque T that is applied during main driving. Thus, the reverse rotational torque applied to the component 4 is negligibly small.

In the case of the second pattern, a high tensile stress occurs during reversing in the low-tension portion 35 and the low-tension portion 36 in which the compressive residual stress is low. However, the component 4 rotates in the reverse direction less frequently than in the main driving direction. Thus, the reverse rotational torque applied to the component 4 is negligibly small.

Therefore, for the low-tension portion 35 and the low-tension portion 36 in which the tensile stress has a low load or occurs with low frequency as described above, laser peening can be omitted, or even when laser peening is performed, a lower compressive residual stress can be imparted, to thereby reduce the processing time. Thus, it is possible to reduce the processing time of laser peening while enhancing the strength of the component 4, by setting the compressive residual stress in the high-tension portion 33 and the high-tension portion 34 of the inner wall 32 to be higher than the compressive residual stress in the low-tension portion 35 and the low-tension portion 36 of the inner wall 32.

Alternatively, although this requires a processing time, a high compressive residual stress may also be imparted to the low-tension portion 35 and the low-tension portion 36 in which the tensile stress has a low load or occurs with low frequency. Specifically, the compressive residual stress in radial portions of the inner wall 32 located at the rotation angles of 45°, 135°, 225°, 315° in the circumferential direction 82 from the radial direction 81 may be set to be higher than the compressive residual stress in radial portions of the inner wall 32 located at the rotation angles of 90°, 180°, 270°, 360° in the circumferential direction 82 from the radial direction 81. Thus distributing the magnitude of the compressive residual stress so as to vary periodically in the circumferential direction 82 of the hole 30 can enhance the strength of the component 4 relative to the rotation of the torque T in both directions around the central axis C1 as the rotational axis.

Figure 21:
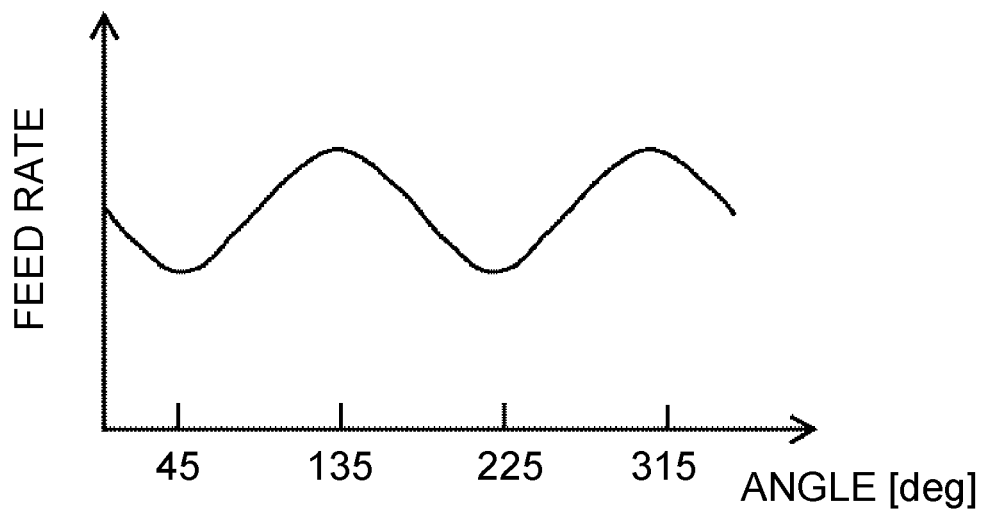
FIG. 21 is a graph illustrating a feed rate of a laser beam spot in the laser peening process according to Embodiment 4, with the horizontal axis showing the position in the inner wall represented by the rotation angle in the circumferential direction of the hole, and the vertical axis showing the feed rate of the laser beam spot.

FIG. 21 is a graph illustrating a spot feed rate of the laser beam 40 in the laser peening process according to Embodiment 4, with the horizontal axis showing the position in the inner wall 32 represented by the rotation angle in the circumferential direction 82 of the hole 30, and the vertical axis showing the spot feed rate of the laser beam 40.

As shown in FIG. 21, the spot feed rate of the laser beam 40 with which the high-tension portion 33 and the high-tension portion 34 are irradiated is set to be lower than the spot feed rate of the laser beam 40 with which the low-tension portion 35 and the low-tension portion 36 are irradiated. Thus, the compressive residual stress in the high-tension portion 33 and the high-tension portion 34 can be made higher than the compressive residual stress in the low-tension portion 35 and the low-tension portion 36.

Thus, the feed rate of the laser beam 40 with which the inner surface 31 is irradiated may be varied in the circumferential direction 82 of the hole 30, to thereby distribute the magnitude of the compressive residual stress imparted to the inner wall 32 so as to vary in the circumferential direction 82. For example, the feed rate of the laser beam 40 may be varied periodically in the circumferential direction 82 of the hole 30.

As the method of distributing the magnitude of the compressive residual stress in the inner wall 32 so as to vary in the circumferential direction 82 of the hole 30, the method of reducing the spot diameter and the method of reducing the spot feed rate have been described. Other examples of the method include a method of reducing the incident angle to the inner surface 31, a method of increasing the energy density of the laser beam 40, and a method of increasing the number of overlapping shots of pulses of the pulsed laser beam 40.

Figure 22:
FIG. 22 is a graph illustrating a relationship between an incident angle of the laser beam and a residual stress according to Embodiment 4, with the horizontal axis showing the incident angle and the vertical axis showing the residual stress.

FIG. 22 is a graph illustrating a relationship between the incident angle of the laser beam and a residual stress according to Embodiment 4, with the horizontal axis showing the incident angle and the vertical axis showing the residual stress. As shown in FIG. 22, laser peening at a smaller incident angle of the laser beam 40 to the inner surface 31 can impart a higher compressive residual stress to the inner wall 32.

Figure 23:
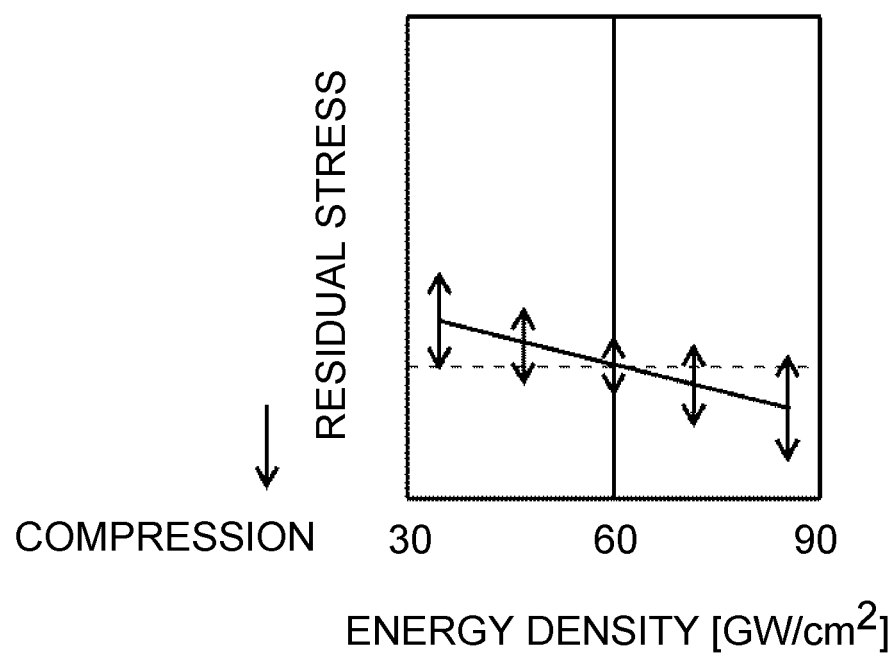
FIG. 23 is a graph illustrating a relationship between an energy density of the laser beam and a residual stress according to Embodiment 4, with the horizontal axis showing the energy density and the vertical axis showing the residual stress.

FIG. 23 is a graph illustrating a relationship between the energy density of the laser beam and a residual stress according to Embodiment 4, with the horizontal axis showing the energy density and the vertical axis showing the residual stress. As shown in FIG. 23, laser peening at a higher energy density of the laser beam 40 can impart a higher compressive residual stress to the inner wall 32.

Figure 24:
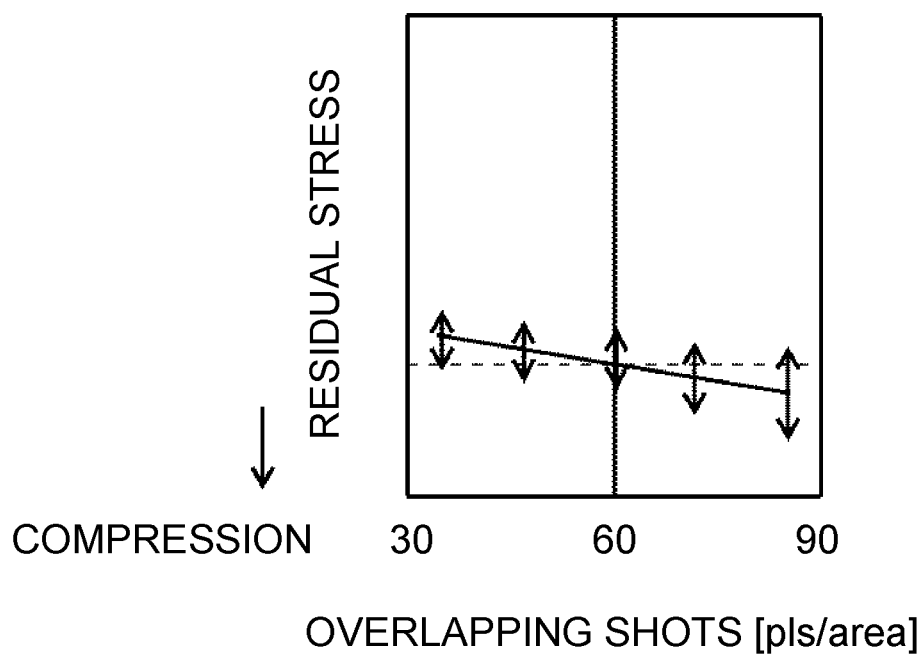
FIG. 24 is a graph illustrating a relationship between the number of overlapping shots of laser beam pulses and a residual stress according to Embodiment 4, with the horizontal axis showing the number of overlapping shots of laser beam pulses and the vertical axis showing the residual stress.

FIG. 24 is a graph illustrating a relationship between the number of overlapping shots of laser beam pulses and a residual stress according to Embodiment 4, with the horizontal axis showing the number of overlapping shots of pulses and the vertical axis showing the residual stress. As shown in FIG. 24, laser peening with a larger number of overlapping shots of pulses of the laser beam 40 can impart a higher compressive residual stress to the inner wall 32.

Thus, at least one of the irradiation conditions, including the spot diameter, feed rate, incident angle, energy density, and number of overlapping shots of pulses, of the laser beam 40 with which the inner surface 31 is irradiated is varied in the circumferential direction 82 of the hole 30. The magnitude of the compressive residual stress in the inner wall 32 can be thereby distributed so as to vary in the circumferential direction 82 of the hole 30. For example, at least one of these irradiation conditions is varied periodically in the circumferential direction 82 of the hole 30. Thus, the magnitude of the compressive residual stress in the inner wall 32 can be distributed so as to vary periodically in the circumferential direction 82 of the hole 30.

FIG. 25 is a view illustrating the control factors, composite parameters, processing principles, and characteristic values of laser peening. As shown in FIG. 25, examples of the control factors of laser peening include the energy per pulse [mJ/pls], spot diameter [mm], spot pitch [mm], pulse interval [pls/sec], and processing area [$mm^2$].

Examples of the composite parameters of laser peening include the pulse energy density [$GW/cm^2$] and the feed rate [mm/sec]. The pulse energy density is linked with the pulse energy and the spot diameter. The feed rate is linked with the spot pitch and the pulse interval.

Examples of the processing principles of laser peening include the plasma pressure [GPa], the overlap ratio [pls/area], and the processing rate [$mm^2$/sec]. The plasma pressure is linked with the pulse energy density. The overlap ratio is linked with the spot diameter and the spot pitch. The processing rate is linked with the spot diameter and the feed rate.

Examples of the characteristic values of laser peening include the residual stress [MPa] and the processing time [sec]. The residual stress is linked with the plasma pressure and the overlap ratio. The processing time is linked with the processing rate and the processing area.

The control factors may be controlled such that the magnitude of the compressive residual stress in the inner wall 32 of the hole 30 is distributed so as to vary in the circumferential direction 82 of the hole 30. Moreover, a composite parameter combining control factors may be controlled such that the magnitude of the compressive residual stress in the inner wall 32 of the hole 30 is distributed so as to vary in the circumferential direction of the hole 30. Furthermore, a parameter concerning the processing principles may be used. By controlling these parameters, it is possible to distribute the magnitude of the compressive residual stress in the inner wall 32 of the hole 30 so as to vary in the circumferential direction of the hole 30, and thereby to improve the characteristic values of the residual stress and the processing time.

In the case where the irradiation conditions such as the spot diameter are varied in the circumferential direction 82 of the inner wall 32 in this embodiment, the method of Embodiment 1 that does not involve creating a flow of the fluid 55 may be used, or the method of the modified example of Embodiment 1 that involves creating a flow of the fluid 55 may be used. In the case where a plurality of holes 30 is formed, at least one hole 30 other than the hole 30 to be irradiated with the laser beam 40 may be masked as in Embodiment 2. Moreover, in the process of irradiating the irradiation areas such as the high-tension portions 33, 34 with the laser beam 40, the method of Embodiment 3 in which the spot that does not overlap with the spot having been irradiated last is irradiated with the laser beam 40 may be used. In this process, at least one hole 30 of the plurality of holes 30 other than the hole 30 to be irradiated with the laser beam 40 may be masked as in Embodiment 2.

Next, effects of this embodiment will be described. According to this embodiment, it is possible to impart a compressive residual stress so as to counteract a tensile stress occurring in the component 4, and thereby to enhance the strength of the component 4. Moreover, it is possible to reduce the time required for laser peening by imparting a relatively low compressive residual stress to, or omitting laser peening for, the portions of the inner wall 32 that are not subjected to a high tensile stress. Other effects of this embodiment are included in the effects described in Embodiment 1, the modified example, and Embodiments 2 and 3.

While the embodiments according to the present disclosure have been described above, the present disclosure is not limited to the above configurations but can be modified within the scope of the technical concept of the disclosure. Moreover, components and component manufacturing methods combining the features of Embodiment 1, the modified example, and Embodiments 2 to 4 are also included in the scope of the technical concept of the present disclosure.

Furthermore, the following component manufacturing methods are also included in the scope of the technical concept described in Embodiment 1, the modified example, and Embodiments 2 to 4.

A component manufacturing method comprising a laser peening process of performing laser peening on an unprocessed component having a hole that has an opening in an outer surface of the unprocessed component by irradiating an inner wall of the hole with a laser beam in a fluid, the laser peening process including the steps of: disposing the unprocessed component in the fluid; setting an irradiation area of the laser beam in an inner surface of the hole; and irradiating the irradiation area with the laser beam from a side of the outer surface through the opening in the fluid, wherein in the step of setting an irradiation area of the laser beam, the irradiation area of the laser beam is set such that a plurality of spots of the laser beam are disposed in the inner surface along a circumferential direction of the hole, with each spot partially overlapping with and shifted by a predetermined amount from a preceding spot; and in the step of irradiating with the laser beam, each of the spots is irradiated with the laser beam in such a manner that the spot that does not overlap with the spot having been irradiated last is irradiated with the laser beam.

A component manufacturing method comprising a laser peening process of performing laser peening on an unprocessed component having a hole that has an opening in an outer surface of the unprocessed component by irradiating an inner wall of the hole with a laser beam in a fluid, the laser peening process including the steps of: disposing the unprocessed component in the fluid; setting an irradiation area of the laser beam in an inner surface of the hole; and irradiating the irradiation area with the laser beam from a side of the outer surface through the opening in the fluid, wherein in the step of irradiating with the laser beam, an irradiation condition of the laser beam with which the inner surface is irradiated is varied in a circumferential direction of the hole.

What is claimed is:

1. A component manufacturing method comprising:
   immersing an unprocessed component in a fluid, the unprocessed component presenting a shape of a cylinder having a cavity inside and a hole that has an opening in an outer surface of the unprocessed component, the hole extending from the opening to the cavity, the unprocessed component having a first central axis, the hole having a second central axis that has an origin at a point on the first central axis and extends along a radial direction of the unprocessed component orthogonal to the first central axis;
   creating a flow of the fluid such that air bubbles resulting from laser peening performed by irradiating an inner wall of the hole of the unprocessed component with a laser beam in the fluid flow along the hole, the flow of the fluid being oriented from a side of the outer surface toward the cavity;
   setting an irradiation area of the laser beam in an inner surface of the hole by controlling a stage on which the unprocessed component is disposed, the stage being rotatable around the first central axis and the second central axis; and
   in the fluid of which the flow has been created, irradiating the irradiation area with the laser beam from a side of the outer surface through the opening, wherein:
   in setting the irradiation area of the laser beam, the irradiation area is set such that a plurality of spots of the laser beam are disposed in the inner surface along a circumferential direction of the hole, with each spot partially overlapping with and shifted by a predetermined amount from a preceding spot; and
   in irradiating each of the spots disposed in the inner surface along the circumferential direction of the hole with the laser beam, the stage is rotated around the second central axis so that n segment regions are irradiated with the laser beam in turns such that the spot that does not overlap with the spot having been irradiated last with the laser beam is irradiated with the laser beam.

2. The component manufacturing method according to claim 1, wherein:
   the unprocessed component is provided with a plurality of the holes;
   in creating the flow of the fluid, a pump that suctions the fluid is connected to the cavity; and
   at least one of the holes other than the hole that is to be irradiated with the laser beam is masked.

3. The component manufacturing method according to claim 1, wherein, in irradiating with the laser beam, an irradiation condition of the laser beam with which the inner surface is irradiated is varied in a circumferential direction of the hole.

4. The component manufacturing method according to claim 3, wherein:
   in irradiating with the laser beam, the irradiation condition is varied periodically in the circumferential direction of the hole.

5. The component manufacturing method according to claim 4, wherein:
   in irradiating with the laser beam, the irradiation condition is varied such that a compressive residual stress occurring in radial portions of the inner wall located at rotation angles of 45° and 225° in one circumferential direction of the hole from one radial direction of the hole becomes higher than a compressive residual stress occurring in the radial portions of the inner wall located at rotation angles of 135° and 315° in the one circumferential direction from the one radial direction, the one radial direction being one of radial directions of the hole that are parallel to the first central axis among radial directions of the hole having an origin at a point on the second central axis and orthogonal to the second central axis.

6. The component manufacturing method according to claim 1, wherein the unprocessed component and the stage are disposed in a tank, the laser beam passes through a side wall of the tank to the irradiation area, and an optical member which guides the laser beam to the irradiation area is disposed outside of the tank.

* * * * *